(12) United States Patent
Piscitelli

(10) Patent No.: US 11,060,415 B2
(45) Date of Patent: Jul. 13, 2021

(54) METHODS AND APPARATUS TO DIAGNOSE A PNEUMATIC ACTUATOR-REGULATING ACCESSORY

(71) Applicant: Fisher Controls International LLC, Marshalltown, IA (US)

(72) Inventor: Brendan Keith Piscitelli, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 343 days.

(21) Appl. No.: 15/877,032

(22) Filed: Jan. 22, 2018

(65) Prior Publication Data

US 2019/0226355 A1    Jul. 25, 2019

(51) Int. Cl.
  *F01D 21/16*    (2006.01)
  *F15B 19/00*    (2006.01)
  (Continued)

(52) U.S. Cl.
  CPC ............ *F01D 21/16* (2013.01); *F15B 13/086* (2013.01); *F15B 19/00* (2013.01); *F15B 19/005* (2013.01);
  (Continued)

(58) Field of Classification Search
  CPC ............ F01D 17/145; F15B 2211/6309; F15B 2211/6313; F15B 2211/6336;
  (Continued)

(56) References Cited

U.S. PATENT DOCUMENTS 5,421,711 A * 6/1995 Newton ................. F01L 25/063
                                                            417/401
8,549,984 B2 * 10/2013 Arnold .................. F15B 20/004
                                                            251/14
(Continued)

FOREIGN PATENT DOCUMENTS

WO    2007087030 A1    8/2007
WO    2013003150 A1    1/2013
(Continued)

OTHER PUBLICATIONS

International Searching Authority, "International Search Report," dated Apr. 24, 2019 in connection with International Patent Application No. PCT/US2019/012952, 5 pages.
(Continued)

*Primary Examiner* — Angelisa L. Hicks
(74) *Attorney, Agent, or Firm* — Hanley, Flight & Zimmerman, LLC

(57) ABSTRACT

Methods, apparatus, systems and articles of manufacture are disclosed to diagnose a pneumatic actuator-regulating accessory. An example method disclosed herein includes stroking a fluid valve operatively coupled to a field instrument and a pneumatic actuator-regulating accessory by pressurizing an actuator operatively coupled to the fluid valve. The example method also includes blocking a supply to the pneumatic actuator-regulating accessory and the field instrument, exhausting pressurized air from the actuator via the field instrument, measuring at least one of (1) positions of the fluid valve or (2) an output pressure as the pressurized air is exhausted from the actuator, and identifying a first operation of the pneumatic actuator-regulating accessory based on at least one of a travel rate of the fluid valve or the output pressure, the travel rate of the fluid valve based on the measured positions of the fluid valve.

14 Claims, 16 Drawing Sheets

(51) Int. Cl.
  *F15B 20/00* (2006.01)
  *F16K 37/00* (2006.01)
  *F15B 13/08* (2006.01)
  *F16K 1/12* (2006.01)
  *F01D 17/14* (2006.01)
  *G05D 16/10* (2006.01)

(52) U.S. Cl.
  CPC ............ *F15B 20/004* (2013.01); *F16K 1/126* (2013.01); *F16K 37/00* (2013.01); *F01D 17/145* (2013.01); *F15B 2211/6309* (2013.01); *F15B 2211/6313* (2013.01); *F15B 2211/6336* (2013.01); *F15B 2211/85* (2013.01); *F15B 2211/855* (2013.01); *F15B 2211/857* (2013.01); *F15B 2211/8633* (2013.01); *F15B 2211/8752* (2013.01); *F15B 2211/8755* (2013.01); *G05D 16/103* (2013.01)

(58) Field of Classification Search
  CPC ............ F15B 2211/85; F15B 2211/855; F15B 2211/857; F15B 2211/8633; F15B 2211/8752; F15B 2211/8755; G05D 16/103
  See application file for complete search history.

(56) References Cited

U.S. PATENT DOCUMENTS

| | | | |
|---|---|---|---|
| 8,579,252 B2* | 11/2013 | Heer | ............... F15B 20/002 137/487.5 |
| 2002/0108436 A1* | 8/2002 | Albuaijan | ........... F16K 37/0083 73/168 |
| 2006/0219299 A1 | 10/2006 | Snowbarger | |
| 2010/0037960 A1 | 2/2010 | Snowbarger | |
| 2012/0048388 A1 | 3/2012 | Snowbarger | |
| 2013/0000753 A1 | 1/2013 | Penning et al. | |
| 2015/0168246 A1 | 6/2015 | Penning et al. | |
| 2015/0323936 A1* | 11/2015 | Junk | ............... F15B 19/005 700/282 |
| 2016/0273676 A1 | 9/2016 | Junk | |
| 2017/0184215 A1 | 6/2017 | Junk | |

FOREIGN PATENT DOCUMENTS

| | | |
|---|---|---|
| WO | 2016149584 A1 | 9/2016 |
| WO | 2017112918 A1 | 6/2017 |

OTHER PUBLICATIONS

International Searching Authority, "Written Opinion," dated Apr. 24, 2019 in connection with International Patent Application No. PCT/US2019/012952, 8 pages.

\* cited by examiner

METHODS AND APPARATUS TO DIAGNOSE A PNEUMATIC ACTUATOR-REGULATING ACCESSORY

FIELD OF THE DISCLOSURE

This disclosure relates generally to valve assembly controllers and, more particularly, to methods and apparatus to diagnose a pneumatic actuator-regulating accessory.

BACKGROUND

In recent years, industrial plants and manufacturers have implemented advanced field instruments for control of valve assemblies. Industrial valve assemblies traditionally require sensitive control systems to ensure proper operation. Valve control systems typically include electrical components (e.g., sensors and controllers) and mechanical devices (e.g., trip valves) to ensure the valve assemblies operate within desired parameters. Some of the mechanical devices of valve control systems have associated design parameters, such as an activation pressure. To verify a mechanical component meets a design parameter, the component typically undergoes analysis via a flow analyzer tool, which in some circumstances produces inconsistent and/or difficult to interpret results.

One example type of mechanical device used in valve control systems is a pneumatic actuator-regulating accessory. A pneumatic actuator-regulating accessory, as used herein, is a mechanical component of a valve assembly that interacts with the flow of control fluid to an actuator of the valve assembly. Pneumatic actuator regulating accessories perform operations, particularly activating and deactivating, based on when flow conditions change (e.g., a supply pressure changes). An example of a pneumatic actuator-regulating accessory is a trip valve, which is a device that exhausts control fluid (e.g., air) from an actuator when a supply pressure falls beneath a threshold.

SUMMARY

An example method disclosed herein includes stroking a fluid valve operatively coupled to a field instrument and a pneumatic actuator-regulating accessory by pressurizing an actuator operatively coupled to the fluid valve. The example method also includes blocking a supply to the pneumatic actuator-regulating accessory and the field instrument, exhausting pressurized air from the actuator via the field instrument, measuring at least one of (1) positions of the fluid valve or (2) an output pressure as the pressurized air is exhausted from the actuator, and identifying a first operation of the pneumatic actuator-regulating accessory based on at least one of a travel rate of the fluid valve or the output pressure, the travel rate of the fluid valve based on the measured positions of the fluid valve.

Another example method disclosed herein includes fully exhausting air from an actuator of a fluid valve operatively coupled to a field instrument and a pneumatic actuator-regulating accessory, the field instrument and the pneumatic actuator-regulating accessory operatively coupled via a first connection and a second connection. The example method also includes supplying air through the first connection, measuring at least one of (1) positions of the fluid valve or (2) an output pressure as the pressure through the second connection is changed, and identifying a first operation of the pneumatic actuator-regulating accessory based on at least one of a travel rate of the fluid valve or the output pressure, the travel rate of the fluid valve based on the measured positions of the fluid valve.

An example non-transitory machine readable medium comprises instructions, which when executed, cause a processor to at least fully exhaust air from an actuator of a fluid valve operatively coupled to a field instrument and a pneumatic actuator-regulating accessory, the field instrument and the pneumatic actuator-regulating accessory operatively coupled via a first connection and a second connection, supply air through the first connection, measure at least one of (1) first positions of the fluid valve or (2) a first system pressure as the pressure through the second connection is changed, after the fluid valve is stroked, measure at least one of (1) second positions of the fluid valve or (2) a second system pressure as the pressure through the second connection is changed, identify a first operation of the pneumatic actuator-regulating accessory based on at least one of a first travel rate of the fluid valve or the first system pressure, the first travel rate of the fluid valve based on the first measured positions of the fluid valve and identify a second operation of the pneumatic actuator-regulating accessory based on at least one of a second travel rate of the fluid valve or the second output pressure, the second travel rate of the fluid valve based on the second measured positions of the fluid valve.

Figure 1:
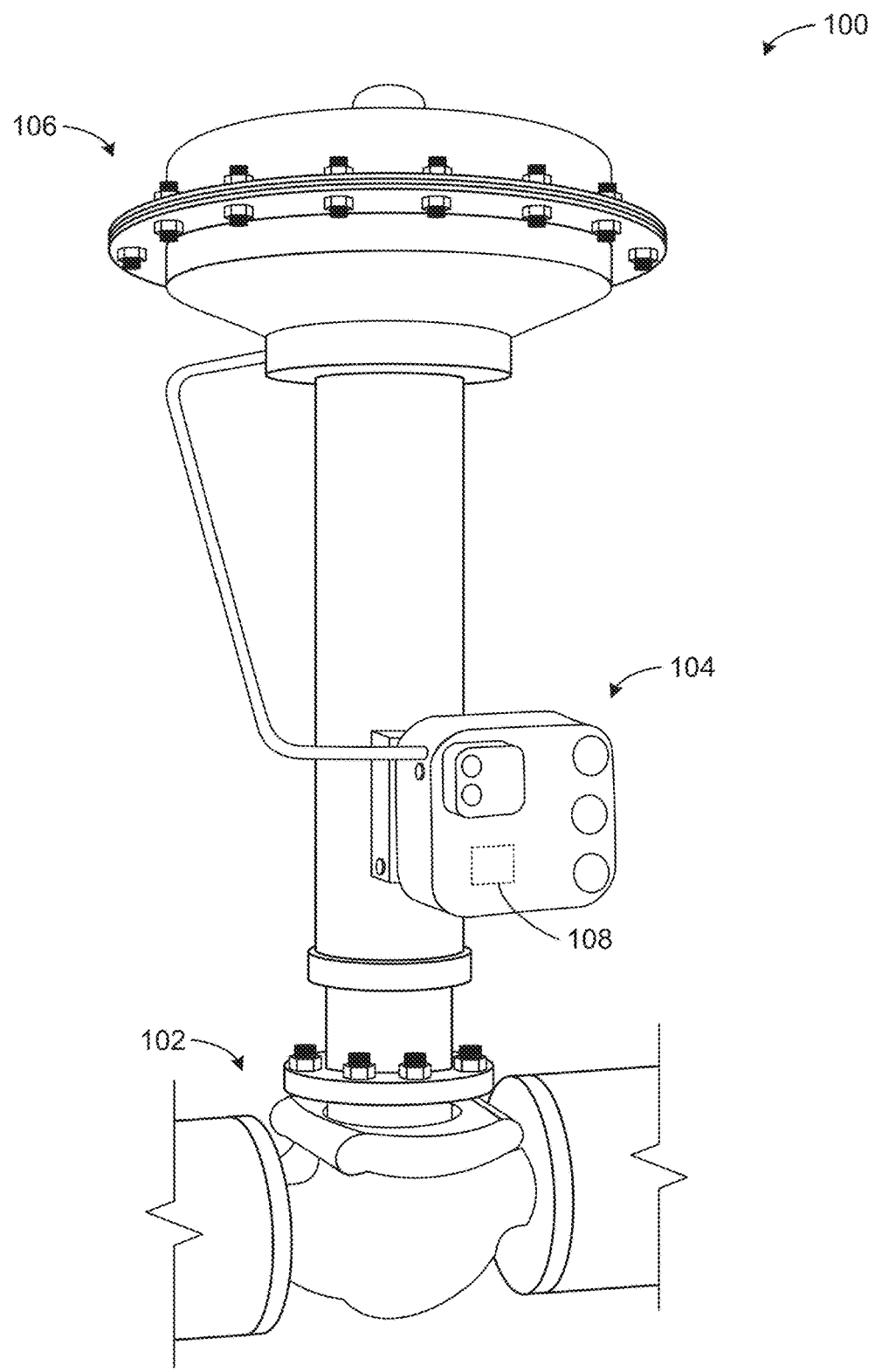
FIG. 1 is an example process control node in which the examples disclosed herein may be implemented.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. As used herein, the terms "coupled" and "operatively coupled" are defined as connected directly or indirectly (e.g., through one or more intervening structures and/or layers).

DETAILED DESCRIPTION

It is often important to understand under what conditions a valve assembly is no longer operable because a pneumatic actuator-regulating accessory has been activated. Historically, the specific flow conditions under which a pneumatic actuator-regulating accessory undergoes an operation (e.g., activation, deactivation, etc.) were determined with a field instrument (e.g., a flow analysis tool such as a Flowscanner). Using this approach, a technician interfaces with the field instrument, which is attached to a valve assembly, to monitor the travel rate of the valve as well as the pressures at various points in the valve assembly. Then, the technician manually modifies the supply pressure to the instrument to determine the pressure at which the pneumatic actuator regulating accessory is activated, deactivated, etc.

However, this known method has several limitations. Specifically, this method lacks a standardized process. For example, if the rate of modifying the supply pressure and, thus, the flow rate of the control fluid to the instrument, is similar to the flow rate through the pneumatic actuator-regulating accessory, it is very difficult to identify when the pneumatic actuator-regulating accessory underwent an operation (e.g., activation, deactivation, etc.) by analyzing the data gathered by the field instrument. Additionally, the lack of standardization in the process often causes inconsistent results between tests, thereby preventing the results of separate tests from being compared to one another.

Examples disclosed herein overcome the above-noted difficulties by utilizing a field instrument (e.g., a FIELDVUE DVC) to perform a standardized diagnostic test to determine the flow conditions under which a pneumatic actuator-regulating accessory undergoes an operation (e.g., activation or deactivation). As used herein, the "activation" of a pneumatic actuator-regulating accessory refers to when flow conditions of the control fluid cause the pneumatic actuator-regulating accessory to interact with the flow of control fluid to or from the actuator and "deactivation" of a pneumatic actuator-regulating accessory refers to when the flow conditions cause the pneumatic actuator-regulating accessory to cease interaction with the flow of control fluid to or from the actuator. Examples disclosed herein for single-acting actuators include a loss of supply pressure diagnostic test for determining a supply pressure at which a pneumatic actuator-regulating accessory activates, a supply pressure deactivation diagnostic test for determining a supply pressure at which a pneumatic actuator-regulating accessory deactivates, and a supply pressure combined diagnostic test for determining supply pressures at which a pneumatic actuator-regulating accessory deactivates and activates. An additional example disclosed herein, is a loss of supply pressure diagnostic test for a double-acting actuator for determining the supply pressure at which a trip valve trips in a system with a double-acting actuator.

Examples disclosed herein determine the operation of a pneumatic actuator-regulating accessory (e.g., a trip valve tripping) by comparing valve travel rates during normal operating conditions and operating conditions after the activation of a pneumatic actuator-regulating accessory. Additionally or alternatively, examples disclosed herein determine the operation of a pneumatic actuator-regulating accessory by monitoring valve assembly control fluid pressures during diagnostic tests for a pneumatic actuator-regulating accessory. As used herein, "normal operating conditions" refers to when a valve assembly is functioning without the pneumatic actuator-regulating accessory being activated.

An example of a pneumatic actuator-regulating accessory includes a pressure sensing trip valve (e.g., a Fisher 377 Trip Valve) that activates when the supply pressure falls below a threshold (e.g., the trip point) to cause the valve actuator to move fully-open, lock in a pre-determined position or fail closed. In some examples, when the pressure rises above the threshold, the pressure sensing trip valve deactivates and restores normal operating conditions. Other examples of pneumatic actuator-regulating accessories include other valve accessories such as a volume booster (e.g., Fisher 2625 Volume Boosters).

FIG. 1 illustrates an example process control node 100 of a valve assembly in which examples disclosed herein may be implemented. The example process control node 100 includes a fluid valve 102 and a field instrument 104. The example process control node 100 also includes a pneumatic actuator 106 and, a processor 108 (e.g., a control processor), which is implemented in the field instrument 104. According to the illustrated example of FIG. 1, the fluid valve 102 may be a sliding stem valve, a rotary valve, etc. that is operable to control flow of a process fluid (e.g., natural gas, water, etc.) flowing through the fluid valve 102.

In this example, the fluid valve 102 is a sliding stem fluid valve having the actuator 106 operatively coupled thereto. A flow control member or valve plug of the fluid valve 102 controls flow of the process fluid through the fluid valve 102. The example actuator 106 may be a pneumatic actuator, a hydraulic actuator or any other suitable actuator that is controlled via a control fluid (e.g., air, water, oil, etc.) that causes stroking or movement of the flow control member between a fully-open state and a closed state. When the fluid valve 102 is in the closed state, the process fluid is substantially prevented from flowing therethrough by the flow control member. Conversely, when the fluid valve 102 is in the fully-open state, the process fluid is enabled to flow therethrough relatively unobstructed by the flow control member. As used herein, "stroking" refers to moving the flow control member of fluid valve 102 between the fully-open state and the closed state or, conversely, between the closed state and the fully-open state.

In this example, the actuator 106 is a pneumatic piston actuator that responds to at least one control fluid pressure provided to the actuator 106. The control fluid pressure is controlled by the field instrument 104 and causes the actuator 106 to generate an output force (or torque) and/or pressure to move the flow control member of the fluid valve 102. The actuator 106 may be a single-acting actuator (e.g., an actuator driven by a control fluid on one side of a diaphragm) or a double-acting actuator (e.g., an actuator driven by a control fluid on both sides of a diaphragm). Single-acting actuators may be fluid-to-open devices (e.g., an increase in control fluid pressure forces the valve open in operation) or may be fluid-to-close devices (e.g., an increase in control fluid pressure forces the valve closed in operation). Example diagnostics tests for pneumatic actuator-regulating accessories are disclosed herein for valve assemblies with single-acting actuators and double-acting actuators as described below.

The example field instrument 104 includes the example processor 108 but, in other examples, the processor 108 may be external to the fluid instrument 104 (e.g., in a laptop coupled to the field instrument 104) and/or communicatively coupled to the field instrument 104 from a remote location (e.g., a control room, a remote server, etc.). In particular, the processor 108 may communicate with the fluid instrument 104 using one or more wired and/or wireless communication networks, such as a process control network associated with the fluid valve 102 and/or the fluid instrument 104. According to the illustrated example, the processor 108 controls the fluid valve 102 by executing instructions to vary the pressure and/or flow path of the control fluid and, thus, the output force of the actuator 106 and the position of the flow control member of the valve 102. This movement of the flow control member can be controlled by parameters and/or settings that are programmed into the field instrument 104 and/or the processor 108.

Figure 2:
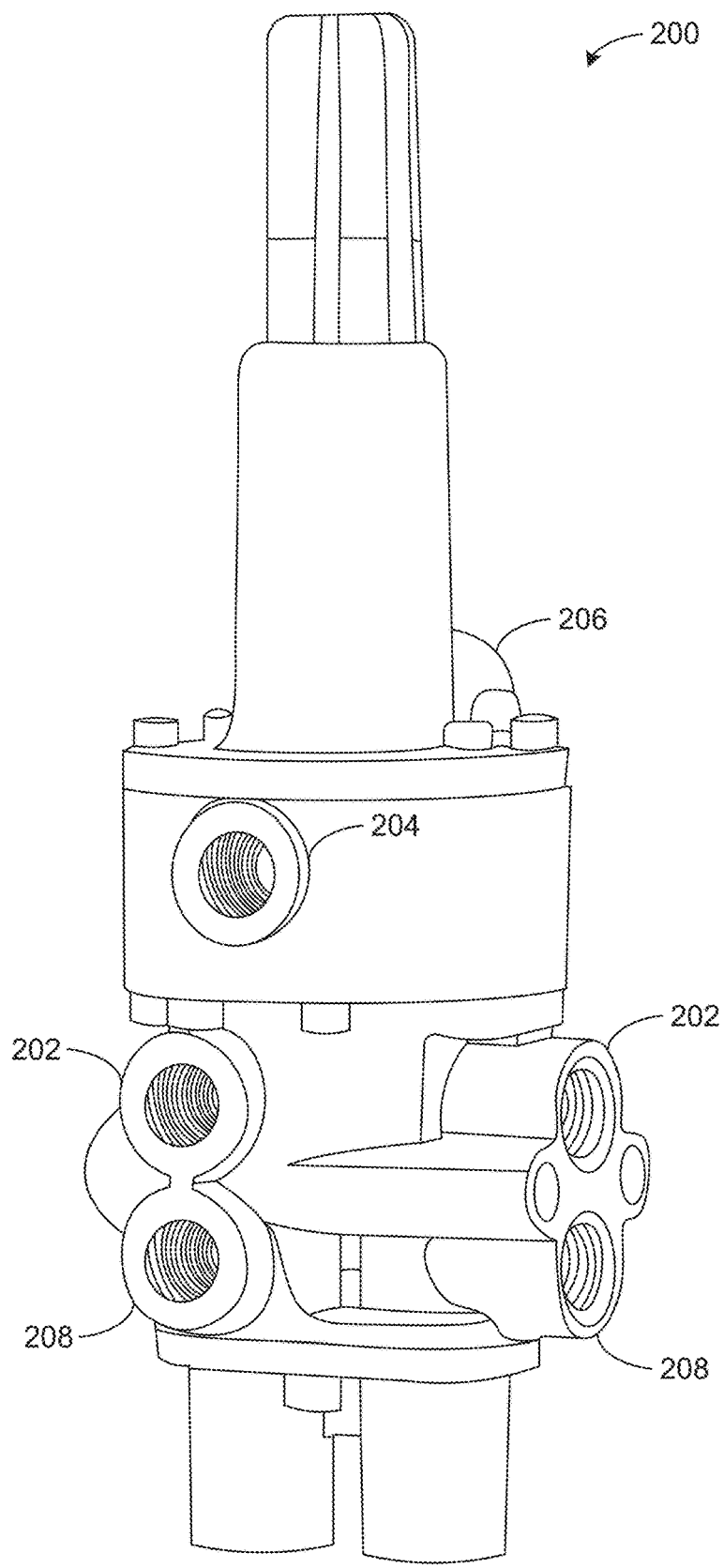
FIG. 2 is an illustration of a pneumatic actuator-regulating accessory.

FIG. 2 is an illustration of a pneumatic actuator-regulating accessory 200. In this example, the pneumatic actuator-regulating accessory 200 is a trip valve (e.g., a Fisher 377 Trip Valve). In other examples, the pneumatic actuator-regulating accessory 200 may be a volume booster (e.g., a Fisher 2625 Volume Booster) or any other similar pressure-activated pneumatic valve accessory for regulating a valve actuator. The example pneumatic actuator-regulating accessory 200 includes at least one field instrument port 202, at least one supply port 204, at least one exhaust port 206 and at least one actuator port 208. The ports 202, 204 which are connected in a valve assembly and the manner in which they are connected depends on the desired function of the pneumatic actuator-regulating accessory 200 and the specific valve assembly to which the pneumatic actuator-regulating accessory 200 is operatively coupled. The pneumatic actuator-regulating accessory 200 position in the valve assembly varies as required and can, for example, be top-mounted on a manifold, yoke-mounted or bracket-mounted to suit application requirements.

The field instrument ports 202 allow the pneumatic actuator-regulating accessory 200 to be operatively coupled to the field instrument 104 (FIG. 1). In some examples, this allows the field instrument 104 to monitor the flow properties of the control fluid associated with the port 202. In some examples, the field instrument port 202 receives the flow of control fluid that, absent the pneumatic actuator-regulating accessory 200, would otherwise flow to an actuator port 206. For example, in the case of a double-acting actuator, two field instrument ports 202 are used to couple the pneumatic actuator-regulating accessory 200 to the field instrument 104, with one of the field instrument ports 202 receiving the flow of control fluid intended for a closed-biasing portion of the double-acting actuator and the other port 202 receiving the flow of control fluid intended for an open-biasing portion of the double-acting actuator.

Figure 3:
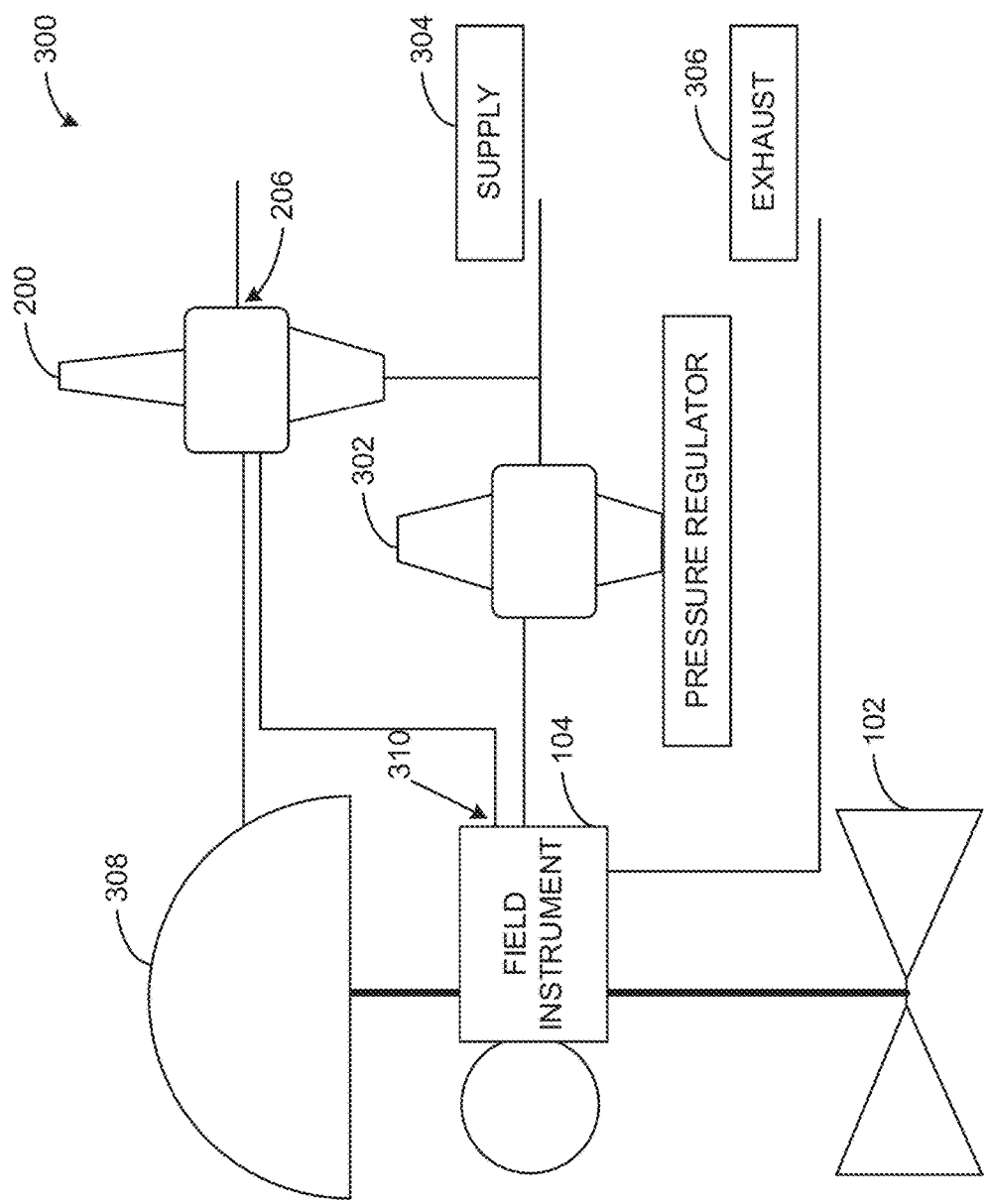
FIG. 3 is a schematic diagram of a valve assembly with a single-acting actuator in which an example loss of supply pressure diagnostic test for a pneumatic actuator-regulating accessory may be implemented.

The supply port 204 is used to operatively couple the pneumatic actuator-regulating accessory 200 to a supply (for example, the supply 304 of FIG. 3). In some examples, the supply port 204 allows the pneumatic actuator-regulating accessory 200 to monitor the supply pressure of the control fluid. In some examples, if the supply pressure of the control fluid crosses a threshold (e.g., decreases from 20 psi to 15 psi crossing a threshold of 18 psi), the flow of the control fluid through the supply port 204 triggers the activation of the pneumatic actuator-regulating accessory 200 (e.g., crossing the trip point of a trip valve causes the trip valve to trip). In some examples, when the supply pressure returns to normal operating conditions (e.g., returns from 15 psi to 20 psi), the pneumatic actuator-regulating accessory 200 deactivates and returns the valve assembly to normal operating conditions. In other examples involving a volume booster, a sudden change in supply pressure can trigger the movement of a diaphragm to correct for the sudden change, allowing for stable actuator operation.

The exhaust port 206 is used to operatively couple the pneumatic actuator-regulating accessory 200 to an exhaust outlet. In some examples, the exhaust port 206 is only used during the activation of the pneumatic actuator-regulating accessory 200 to remove control fluid from the valve assembly (e.g., exhausting air from the actuator 106 when a trip valve trips or exhausting air from the supply port when a volume booster boosts). In some examples, during normal operating conditions (e.g., when the trip valve is untripped), a diaphragm, spring-loaded plug or any other suitable means is used to hold the exhaust port 206 closed and isolated from the control fluid flow. When the pneumatic actuator-regulating accessory 200 undergoes its operation (e.g., a trip valve trips), the spring-loaded plug or any other suitable means is forced open allowing the control fluid flow to be exhausted through the exhaust port 206. In some examples, the exhaust port 206 exhausts to the atmosphere. In other examples, the control fluid exhausted via the exhaust port 206 is exhausted into a storage container.

The actuator port 208 is used to operatively couple the pneumatic actuator-regulating accessory 200 to the actuator 106. In some examples, control fluid flowing through the actuator port 208 provides operating pressure to the actuator 106. In some examples, the control fluid flowing through the actuator port 208, after the operation of the pneumatic actuator-regulating accessory 200, is exhausted through the exhaust port 206. In some examples, during normal operating conditions, flow of control fluid moves directly into the field instrument port 202, through the pneumatic actuator-regulating accessory 200 and into the actuator 106. In other examples, the control fluid flows out of the actuator 106 through the pneumatic actuator-regulating accessory 200 and then out though the field instrument port 202.

FIG. 3 is a schematic diagram of a valve assembly 300 with a single-acting actuator in which an example loss of supply pressure diagnostic test for a pneumatic actuator-regulating accessory 200 may be implemented. The example valve assembly 300 includes the fluid valve 102 (of FIG. 1), the field instrument 104 (of FIG. 1), the pneumatic actuator-regulating accessory 200 (of FIG. 2), a pressure regulator 302, a supply 304, an exhaust 306, and a single-acting fluid-to-open actuator 308. In the illustrated example, the field instrument 104 is coupled via a connection 310 to the pneumatic actuator-regulating accessory 200, the exhaust 306, the fluid valve 102, the supply 304 and the pressure regulator 302. In the illustrated example, the actuator 308 is mechanically coupled to the valve 102 such that movement of the actuator 308 causes a linear movement of the flow control member in the fluid valve 102. Additionally, the pressure regulator 302 is coupled to the supply 304, and the pneumatic actuator-regulating accessory 200 is fluidly coupled to the actuator 308 and the supply 304. Additionally, in some examples, the pneumatic actuator-regulating accessory 200 has an exhaust (e.g., the exhaust port 206 of FIG. 2), which is distinct from the exhaust 306 and which opens or vents when the pneumatic actuator-regulating accessory 200 activates (e.g., trips).

In some examples, the pressure regulator 302 ensures that excess pressure delivered to the valve assembly 300 by the supply 304 does not affect the field instrument 104. For example, if the supply 304 delivers a pressure of 32 psi and the field instrument 104 is designed to operate at 30 psi, the pressure regulator 302 may be configured to regulate the supply pressure of the control fluid to 30 psi.

The example supply 304 supplies control fluid to the valve assembly 300. In this example, the control fluid is pressurized air (e.g., the system is pneumatic). Alternatively, the control fluid may be any other suitable fluid (e.g., water or oil). In some examples, the air supplied by the supply 304 is from a compressor, a pressurized tank or any other suitable means of supplying pressurized air. In the illustrated example, unless otherwise noted, the flow properties of the control fluid supplied by the supply 304 are constant (e.g., the temperature and density of the control fluid emitted by the supply 304 remain constant throughout each test).

The example exhaust 306 removes control fluid from the valve assembly 300 when open. In some examples, the example exhaust 306 is controlled (e.g., opened and closed) via commands issued by the field instrument 104. In the illustrated example, as air is exhausted from the valve assembly 300, control fluid leaves the actuator 308, flows through the pneumatic actuator-regulating accessory 200 and field instrument 104 and then to the atmosphere through the exhaust 306, which causes the actuator 308 to close. In the illustrated example, the area and length of the flow path of the exhaust 306 (e.g., based on the diameter and or length of the pipe) are known. The rate of which the actuator 308 moves (e.g., toward a closed condition) while control fluid is exhausted via a fully-open the exhaust 306 is referred to herein as the "maximum travel rate" of the valve 102 under normal operating conditions.

In the illustrated example, the actuator 308 is a single-acting fluid-to-open direct actuator. As used herein, a "direct actuator" is an actuator where movement in the actuator 308 is mechanically transferred to an equivalent movement in the flow control member of the fluid valve 102. For example, if a change in the pressure of the control fluid causes the actuator 308 to move one inch, this movement causes the flow control member of the fluid valve 102 to move one inch. In the illustrated example, during operation, the control fluid urges the actuator 308 to open, allowing the process fluid to flow freely through the fluid valve 102. When the field instrument 104 issues a command to open the exhaust 306, control fluid flows from the actuator 308, through the pneumatic actuator-regulating accessory 200, into the field instrument 104 and through the exhaust 306. Additionally or alternatively, if the supply pressure of the control fluid supplied by the supply 304 crosses the threshold of the pneumatic actuator-regulating accessory 200, thus causing the pneumatic actuator-regulating accessory 200 to activate, control fluid is exhausted via the pneumatic actuator-regulating accessory exhaust port 206.

Flowcharts representative of example machine readable instructions for implementing the field instrument 104 of FIG. 1 are shown in FIGS. 4, 7, 9, 10, 12 and 15. In this example, the machine readable instructions comprise a program for execution by a processor such as a processor 108 shown in the example processor platform 1600 discussed below in connection with FIG. 16. The program may be embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowcharts illustrated in FIGS. 4, 7, 9, 10, 12 and 15, many other methods of implementing the example field instrument 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 4, 7, 9, 10, 12 and 15 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 4:
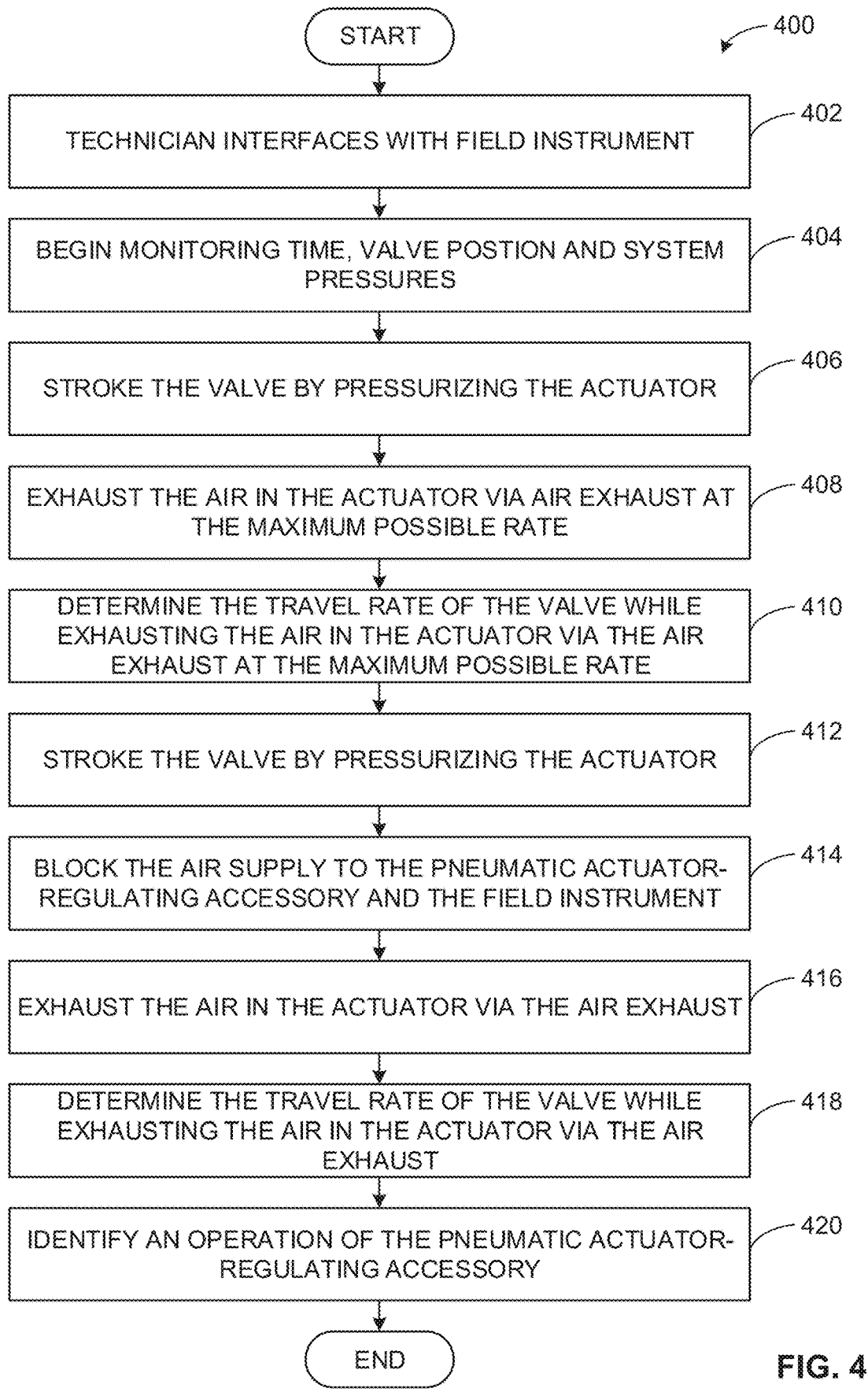
FIG. 4 is a flowchart representative of an example method for conducting the loss of supply pressure diagnostic test for a pneumatic actuator-regulating accessory on the valve assembly of FIG. 3.

An example method 400 of implementing a loss of supply pressure diagnostic test on a valve assembly (e.g., the valve assembly 300 of FIG. 3) is described in FIG. 4, which begins at begins at block 402. At block 402, a technician interfaces with the field instrument 104. For example, a technician may interface with the field instrument 104 with a laptop or tablet via a USB dongle connection. Additionally or alternatively, a technician may remotely interface with the field instrument 104 from a control room. In some examples, the technician initiates the loss of supply pressure diagnostic test. At block 404, the field instrument 104 begins monitoring time, valve position and system pressures. For example, the field instrument 104 may measure the position of the valve 102 directly or indirectly by monitoring the position of the actuator 308. Additionally, in some examples, the field instrument 104 monitors the pressure of the control fluid delivered from the supply 304 as well as the pressure at the connection of the field instrument 104 to the pneumatic actuator-regulating accessory 200 (e.g., the connection 310). An example graph 500 of times, valve positions and system pressures of method 400, as recorded by the field instrument 104, is represented in FIG. 5.

Figure 5:
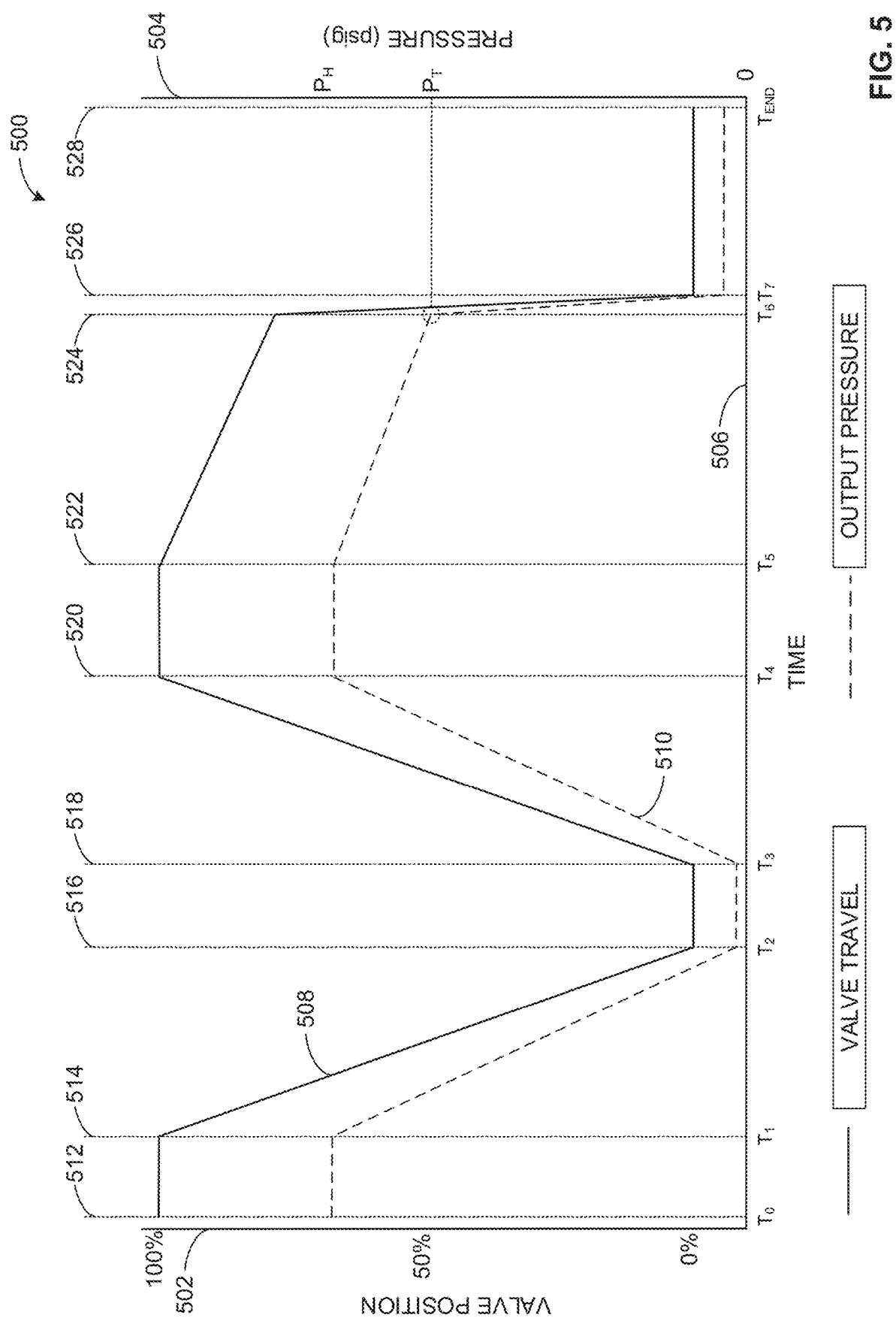
FIG. 5 is an example valve position and pressure graph of the loss of supply pressure diagnostic test of FIG. 4.

FIG. 5 is an example valve position and pressure graph 500 of the loss of supply pressure diagnostic test method 400 of FIG. 4. The graph 500 has a first y-axis 502, a second y-axis 504, and an x-axis 506. Additionally, the graph 500 tracks valve travel 508 (represented by a solid line) and output pressure 510 (represented by a dashed line). The example x-axis 506 measures the independent variable time, begins at $T_0$, and ends at $T_{END}$. In some examples, the elapsed time between $T_0$ and $T_{END}$ depends on how quickly the field instrument 104 can change the pressure throughout the example valve assembly 300. Additionally or alternatively, the elapsed time between $T_0$ and $T_{END}$ is selected by the technician. Time points 512, 514, 516, 518, 520, 522, 524, 526, 528 are associated with times $T_1$, $T_2$, $T_3$, $T_4$, $T_5$, $T_6$, $T_7$ and $T_{END}$, respectively.

The first y-axis 502 measures valve position. In the example valve assembly 300, a value of 100% on the first y-axis 502 indicates that valve 102 is in the fully-open state and 0% indicates the valve 102 is in the closed state. Alternatively in some examples, such as in the case the actuator 308 is a single-acting fluid-to-close actuator, a value of 100% on the first y-axis 502 indicates that the valve 102 is in the closed state and 0% indicates that the valve 102 is in the open state. In some examples, a value of 50% on the first y-axis 502 indicates the example valve 102 is half-way between the fully-open state and the closed state. Alternatively, in some examples, the first y-axis 502 may have physical units of measurement (e.g., inches, cm, etc.).

The second y-axis 504 measures pressure ranges from zero to $P_H$, and uses any suitable unit of pressure (e.g., psi, Pa, atm, etc.). In some examples, the upper range of the second y-axis 504, $P_H$, is selected as the pressure that results in the valve 102 being in a fully-open state. In some examples, the upper range of the second y-axis 504, $P_H$, is selected such that it is above the estimated activation threshold of the pneumatic actuator-regulating accessory 200. In other examples, $P_H$ is the maximum allowable valve assembly 300 pressure.

The example line representing valve travel 508 tracks the position of the flow control member of the valve 102 (e.g., with reference to the first y-axis 502) as a function of time (e.g., with reference to the x-axis 506). The example line representing the output pressure 510 tracks the pressure (e.g., with reference to the second y-axis 504) of the connection 310 as a function of time (e.g., with reference to the x-axis 506). In some examples, the output pressure 510 is the pressure at the connection 310 of FIG. 3.

Returning to FIG. 4, at block 406, the field instrument 104 strokes the valve 102 by pressurizing the actuator 308. In some examples, the field instrument 104 pressurizes the actuator 308 by routing control fluid delivered via the supply 304 through the pneumatic actuator-regulating accessory 200 into the actuator 308. In some examples, when the actuator 308 is a fluid-to-open actuator, the field instrument 104 applies control fluid to the actuator 308 until the valve 102 is in the fully-open state. In other examples, such as when the actuator 308 is a fluid-to-close actuator, the field instrument 104 applies control fluid to the actuator 308 until the valve 102 is in the closed state. Time point 512 ($T_0$) of graph 500 is associated with the state of the valve assembly 300 immediately after the execution of block 406. At time point 512, the valve travel 508 is at 100% and the output pressure 510 is at $P_H$, indicating the actuator 308 is fully pressurized.

At block 408, the field instrument 104 exhausts the control fluid in the actuator 308 via the exhaust 306 at the maximum possible rate. For example, the field instrument 104 may open a connection between actuator 308 and the exhaust 306 to enable control fluid to be exhausted from the actuator 308 through the pneumatic actuator-regulating accessory 200, through the field instrument 104 and then out through the exhaust 306. In some examples, the control fluid exhausting associated with the execution of block 408 does not cause the pneumatic actuator-regulating accessory 200 to activate as there is neither a loss of supply pressure to the pneumatic actuator-regulating accessory 200 nor the pressure regulator 302. In some examples, the field instrument 104 exhausts control fluid from the actuator 308 until the valve 102 is fully closed (or fully-open if the actuator 308 is a fluid-to-close device). In some examples, the maximum possible rate is determined by the size of the flow path of the exhaust 306. The time between time point 514 ($T_1$) and time point 516 ($T_2$) of graph 500 is associated with the state of the valve assembly 300 during the execution of block 408. As control fluid is exhausted from the actuator 308 via the exhaust 306, the valve travel 508 and the output pressure 510 decrease linearly until the valve is fully closed (e.g., the valve travel 508 is at 0%) and the output pressure is at atmospheric pressure (e.g., the output pressure 510 is 0 psig). In the illustrated example, the valve travel 508 and the output pressure 510 are linear and continuous between the time points 514 and 516. Alternatively, the valve travel 508 and the output pressure 510 may be any suitable function (e.g., a series of discrete steps, etc.).

At block 410, the field instrument 104 determines the travel rate of the valve while exhausting the control fluid in the actuator 308 via the exhaust 306 at the maximum possible rate. For example, the field instrument 104 may fit a line to the valve travel data 508 collected during the execution of block 408 and record the slope of the fitted line. In other examples, the field instrument 104 may employ any suitable method to determine the valve travel rate caused by the execution of block 408.

At block 412, the field instrument 104 strokes the valve 102 by pressurizing the actuator 308. In some examples, the field instrument 104 pressurizes the actuator 308 by routing the control fluid supplied by supply 304 through the pneumatic actuator-regulating accessory 200 into the actuator 308. In some examples, when the actuator 307 is a fluid-to-open device (e.g., the actuator 308 of FIG. 3) the field instrument 104 directs control fluid to the actuator 308 until the valve 102 is in the fully-open state. In other examples, such as when the actuator 308 is a fluid-to-close device, the field instrument 104 applies control fluid to the actuator 308 until the valve 102 is in the closed state. In some examples, the field instrument 104 returns the valve assembly 300 to the state of the valve assembly 300 prior to block 406. The time between the time point 518 ($T_3$) and the time point 520 ($T_4$) of graph 500 is associated with the state of the valve assembly 300 during the execution of block 412. As the actuator 308 is pressurized, the valve travel 508 and the output pressure 510 increase linearly until the valve is in the fully-open state (e.g., the valve travel 508 is at 100%) and the output pressure 510 is at the pressure associated with the valve 102 being in the fully-open state (e.g., $P_H$).

At block 414, the supply 304 is blocked to the pneumatic actuator-regulating accessory 200 and the field instrument 104. For example, the technician may receive instructions from the field instrument 104 or the device being used to interface with the field instrument 104 to block the supply 304. In this example, the technician manually blocks the supply 304. In other examples, the field instrument 104 may execute instructions that cause the supply 304 to be blocked. In this example, the field instrument 104 may automatically block the supply 304 by interfacing with and closing a valve that controls the flow of the control fluid to the pneumatic actuator-regulating accessory 200 and the field instrument 104. In some examples, blocking the supply 304 causes the pressure of the connection 310 and the supply pressure to equalize. In the illustrated example of graph 500, block 414 is executed between the time points 520 ($T_4$) and 522 ($T_5$).

At block 416, the field instrument 104 exhausts control fluid in the actuator 308 via the exhaust 306. For example, the field instrument 104 may open a connection between the actuator 308 and the exhaust 306 to enable control fluid to be exhausted from the actuator 308 through the pneumatic actuator-regulating accessory 200, through the field instrument 104 and then out through the exhaust 306. In some examples, because the supply 304 was blocked at block 414, the supply pressure to the pneumatic actuator-regulating accessory 200 and the field instrument 104 begins to decrease. In some examples, when the supply pressure to the pneumatic actuator-regulating accessory 200 falls beneath its operation threshold, the pneumatic actuator-regulating accessory 200 activates, causing the control fluid to be exhausted through the pneumatic actuator-regulating accessory 200 (e.g., the exhaust port 206). In some examples, the field instrument 104 exhausts control fluid via the exhaust 306 via small periodic steps (e.g., a staircase function or a sequential ramp function) to ensure the pressure at which the pneumatic actuator-regulating accessory 200 activates can be identified within an acceptable precision and accuracy. In some examples, the small periodic steps cause a successive reduction in the pressure in the actuator 308. In some examples, the rate of the successive reduction in pressure is predetermined to cause a travel rate of the valve 102 to be less that the maximum travel rate of the valve 102.

The time between the time point 522 ($T_5$) and the time point 526 ($T_7$) of the graph 500 is associated with the state of the valve assembly 300 during the execution of block 416. In the illustrated example, the valve travel 508 and the output pressure 510 decrease linearly. Alternatively, if control fluid is exhausted in small periodic steps, the valve travel 508 and the output pressure 510 will also decrease in small periodic steps. This process continues until the output pressure 510 crosses the activation threshold (e.g., $P_T$ on the graph 500) of the pneumatic actuator-regulating accessory 200, which in the illustrated example occurs at the time point 524 ($T_6$). At the time point 524, the exhaust port 206 of the pneumatic actuator-regulating accessory 200 opens, causing the remaining control fluid to be exhausted via the exhaust port 206. The exhausting of the control fluid via the exhaust port 206 is associated with a comparatively rapid decrease in the output pressure 510 and the valve travel 508. The period of time between the time point 524 and the time point 526 is associated with the exhausting of control fluid via the exhaust port 206. After a period time following the time point 526, at the time point 528 ($T_{END}$), the field instrument 104 stops monitoring the valve travel 508 and the output pressure 510.

At block 418, the field instrument 104 determines the travel rate of the valve 102 while exhausting the control fluid in the actuator 308 during block 416. For example, the field instrument 104 may linearly connect the collected data points (e.g., the valve travel 508) and record the slope of each segment. In other examples, the field instrument 104 may employ any suitable method to determine the valve travel rate caused by exhausting the control fluid during block 416.

At block 420, the field instrument 104 identifies an operation of the pneumatic actuator-regulating accessory 200. In some examples, the field instrument 104 identifies the operation of the pneumatic actuator-regulating accessory 200 by comparing the travel rate of the valve 102 determined at block 410 to the travel rate of the valve 102 determined at block 418. In some examples, when the travel rate of the valve 102 determined at block 418 exceeds the travel rate of the valve determined at block 412 (e.g., the slope of the valve travel 508 between the time points 514 and 516 is compared to the slope of the valve travel 508 between the time points 522 and 526), the pneumatic actuator-regulating accessory 200 has activated. Additionally or alternatively, the operation of the pneumatic actuator-regulating accessory 200 may be determined by monitoring the pressure of the connection 310 between the field instrument 104 and the pneumatic actuator-regulating accessory 200. In this example, a sudden decrease in pressure (e.g., the decrease in the output pressure 510 at the time point 524) time indicates that the pneumatic actuator-regulating accessory 200 has activated. In some examples, the associated pressure $P_T$ is noted as the threshold (e.g., trip point) of the pneumatic actuator-regulating accessory 200. In some examples, $P_T$ is compared to the desired value for the pneumatic actuator regulating accessory 200 to diagnose the condition of the pneumatic actuator-regulating accessory 200.

Figure 6:
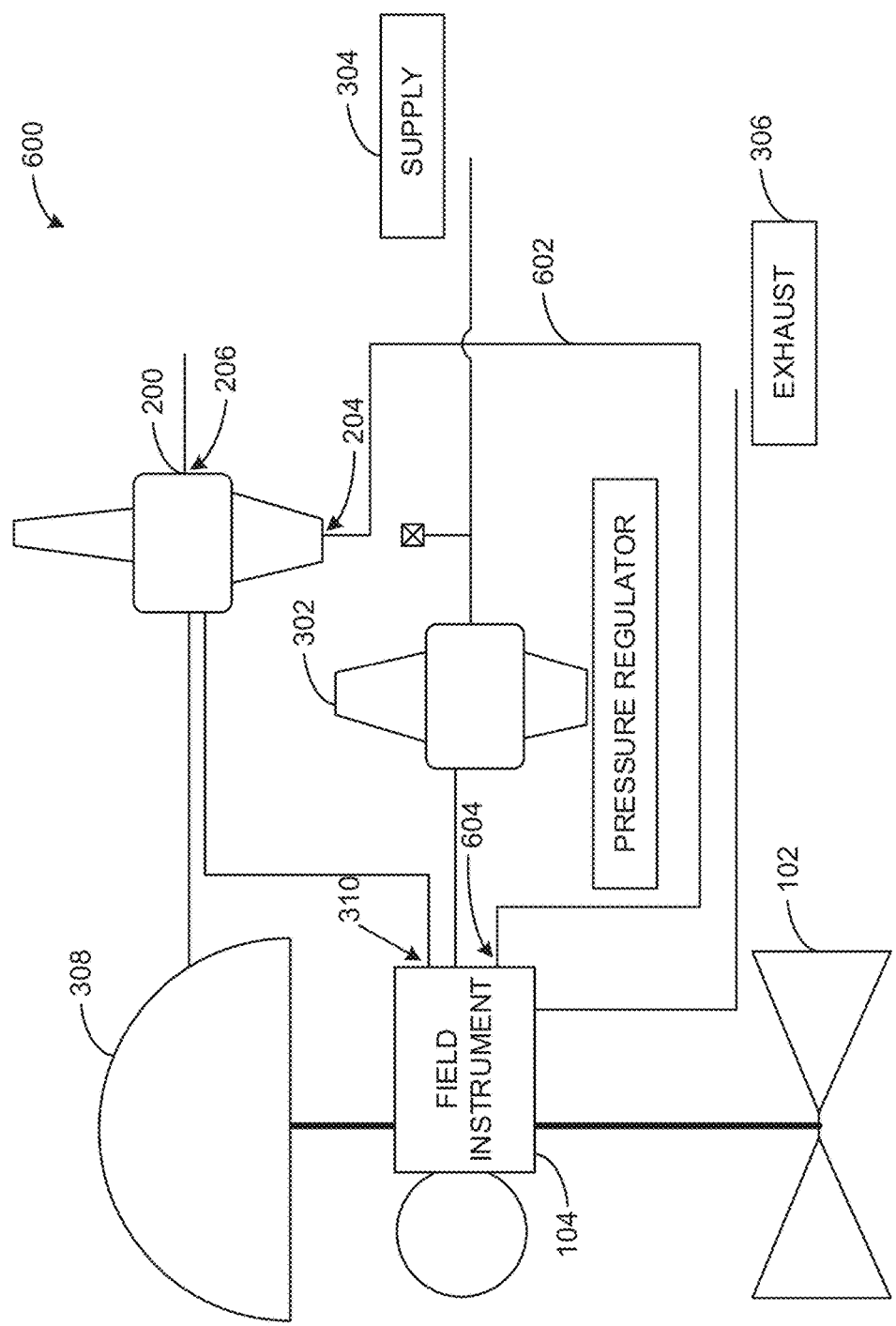
FIG. 6 is a schematic diagram of a valve assembly with a single-acting actuator in which an example supply pressure deactivation diagnostic test and an example supply pressure combined diagnostic test for a pneumatic actuator-regulating accessory may be implemented.

FIG. 6 is a schematic of a valve assembly 600 with the single-acting actuator 308 in which an example supply pressure deactivation diagnostic test and an example supply pressure combined diagnostic test for the pneumatic actuator-regulating accessory 200 may be implemented. The example valve assembly 600 contains the same components as the example valve assembly 300, but in a different configuration. In the illustrated example valve assembly 600, when compared to the example valve assembly 300, the pneumatic actuator-regulating accessory 200 has been decoupled from the supply 304 and tubing 602 has been installed to fluidly couple a second connection 604 of the field instrument 104 to the supply port 204 of the pneumatic actuator-regulating accessory 200. In some examples, the tubing 602 is installed by a technician immediately before initiating the supply pressure deactivation diagnostic test and removed by the technician at the conclusion of the diagnostic test.

Figure 7:
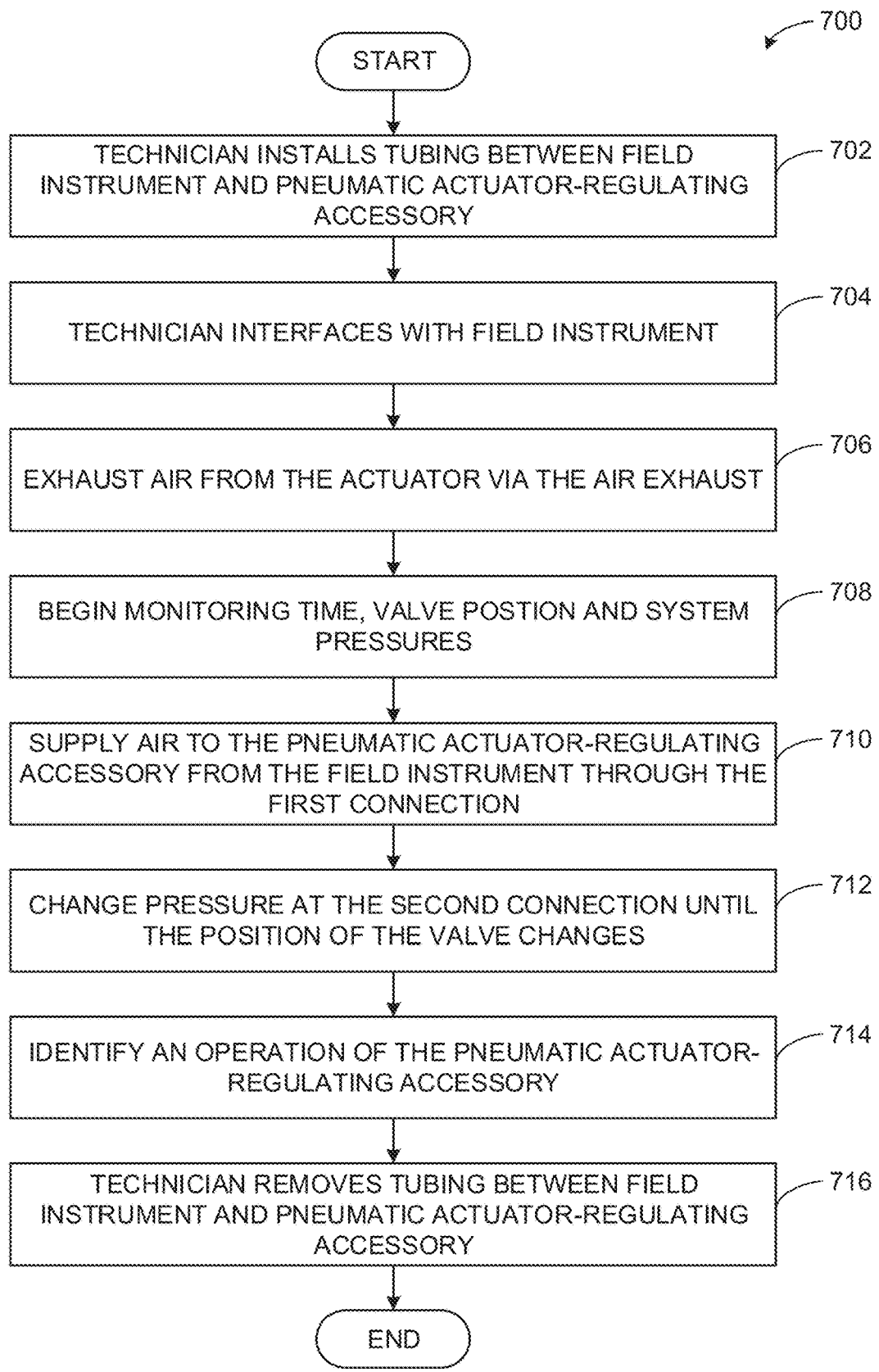
FIG. 7 is a flowchart representative of an example method for conducting the supply pressure deactivation diagnostic test for a pneumatic actuator-regulating accessory on the valve assembly of FIG. 6.

An example method 700 of implementing the supply pressure deactivation diagnostic test on a valve assembly (e.g., the valve assembly 600 of FIG. 6) is described in FIG. 7, which begins at begins at block 702. At block 702, a technician installs the tubing 602 between the second connection 604 of the field instrument 104 and the supply port 204 of the pneumatic actuator-regulating accessory 200. At block 704, the technician interfaces with the field instrument 104. For example, a technician may interface with the field instrument 104 with a laptop or tablet via a USB dongle connection. Additionally or alternatively, a technician may remotely interface with the field instrument 104 from a control room. In some examples, the technician initiates the supply pressure deactivation diagnostic test.

At block 706, the field instrument 104 exhausts air from the actuator 308 via the exhaust 306. For example, the field instrument 104 may open a fluid path between the actuator 308 and the exhaust 306. In some examples, this causes the valve to be stroked (e.g., in the case of the valve assembly 600, move from the fully-open state to the closed state). In some examples, the pressure at the second connection 604, which is acting as the supply pressure to the pneumatic actuator-regulating accessory 200, falls below the activation threshold of the pneumatic actuator-regulating accessory 200 thereby causing the activation of the pneumatic actuator-regulating accessory 200.

At block 708, the field instrument 104 begins monitoring times, valve positions and system pressures. For example, the field instrument 104 may measure the position of the flow control member of the valve 102 directly or indirectly by monitoring the position of the actuator 308 of FIG. 6. Additionally, in some examples, the field instrument 104 measures the pressure at the first connection 310 and the pressure in the tubing 602 (e.g., the second connection 604). An example graph 800 of times, valve positions and system pressures associated with the method 700, as recorded by the field instrument 104, is represented in FIG. 8.

Figure 8:
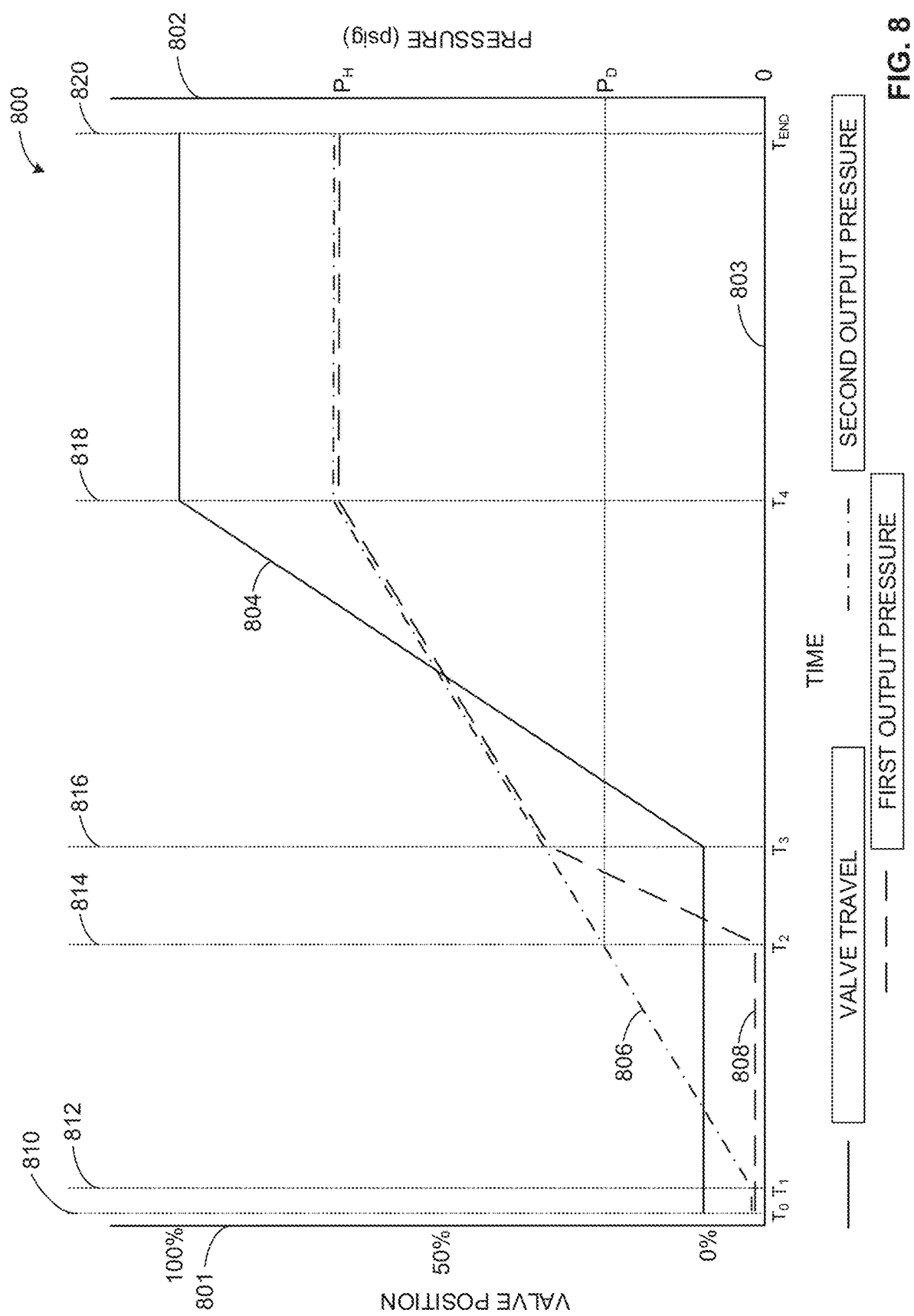
FIG. 8 is an example valve position and pressure graph of the supply pressure deactivation diagnostic test of FIG. 7.

FIG. 8 is an example valve position and pressure graph 800 of the supply pressure deactivation diagnostic test method 700 of FIG. 7. The graph 800 has a first y-axis 801, a second y-axis 802, and an x-axis 803. Additionally, the graph 800 tracks valve travel 804 (represented by a solid line), which represents the travel of the flow control member of the valve 102, a second output pressure 806 at the second connection 604 (represented by a dashed-dotted line) and a first output pressure 808 at the first connection 310 (represented by a dashed line). The x-axis 803 measures the independent variable time beginning at $T_0$ and ending at $T_{END}$. In some examples, the elapsed time between $T_0$ and $T_{END}$ depends on how quickly the field instrument 104 is able to change the pressure throughout the example valve assembly 600. Additionally or alternatively, the elapsed time between $T_0$ and $T_{END}$ is selected by the technician. Time points 810, 812, 814, 816, 818, 820 are associated with times $T_0$, $T_1$, $T_2$, $T_3$, $T_4$ and $T_{END}$, respectively. The field instrument 104 begins monitoring the valve assembly 600 at $T_0$.

The first y-axis 801 measures valve position. In the example valve assembly 600, a value of 100% on the first y-axis 801 indicates that valve 102 is in the fully-open state and 0% indicates the valve 102 is in the closed state. Alternatively in some examples, such as in the case that actuator 308 is a single-acting fluid-to-close actuator, a value of 100% on the first y-axis 801 indicates that the valve 102 is in the closed state and 0% indicates that the valve 102 is in the open state. In some examples, a value of 50% on the first y-axis 801 indicates the example valve 102 is half-way between the fully-open state and the closed state. Alternatively, in some examples, the first y-axis 801 may have physical units of measurement (e.g., inches, cm, etc.).

The second y-axis 802 measures pressure ranges from zero to $P_H$, and uses any suitable unit of pressure (e.g., psi, Pa, atm, etc.). In some examples, the upper range of the second y-axis 802, $P_H$, is selected as the pressure that results in the valve 102 being in a fully-open state. In some examples, the upper range of the second y-axis 802, $P_H$, is selected such that it is above the estimated activation threshold of the pneumatic actuator-regulating accessory 200. In other examples, $P_H$ is the maximum allowable valve assembly 300 pressure.

The example line representing valve travel 804 tracks the position of the flow control member of the valve 102 (e.g., with reference to the first y-axis 801) as a function of time (e.g., with reference to the x-axis 803). The example line representing the first output pressure 808 tracks the pressure (e.g., with reference to the second y-axis 802) at the first connection 310 as a function of time (e.g., with reference to the x-axis 506). The example line representing the second output pressure 806 tracks the pressure (e.g., with reference to the second y-axis 802) at the second connection 604 as a function of time (e.g., with reference to the x-axis 803).

Returning to FIG. 7, at block 710, the field instrument 104 supplies control fluid to the pneumatic actuator-regulating accessory 200 from the field instrument 104 through the first connection 310. For example, the field instrument 104 may route control fluid from the supply 304 to the pneumatic actuator-regulating accessory 200 via the first connection 310. In some examples, because the exhaust port 206 is open, the execution of block 710 does not cause the valve travel 804, the second output pressure 806 at the second connection 604 or the first output pressure 808 at the first connection 310 to increase as the control fluid is immediately exhausted via exhaust port 206.

At block 712, the field instrument 104 begins changing the pressure at the second connection 604 until the position of the flow control member of the valve 102 changes. In some examples, the field instrument 104 changes the pressure at the second connection 604 in small periodic steps (e.g., a staircase function or a sequential ramp function) to ensure the pressure at which the pneumatic actuator-regulating accessory 200 deactivates can be identified within an acceptable precision and accuracy. In some examples, when the pneumatic actuator-regulating accessory 200 is a trip valve and the pressure at the second connection 604 is acting as the supply pressure to the trip valve, an increase of the pressure at the second connection 604 past the untrip threshold of the trip valve causes the trip valve to untrip. In some examples, when the pneumatic actuator-regulating accessory 200 deactivates, the exhaust port 206 (of FIG. 2) closes, allowing the control fluid to enter the actuator 308.

The time point 812 ($T_1$) of the graph 800 (FIG. 8) is associated with the state of the valve assembly 600 immediately after the execution of block 712. At time point 812, the field instrument 104 begins increasing the second output pressure 806. The second output pressure 806 increases until it reaches the deactivation threshold ($P_D$) at $T_2$. At the time point 814 ($T_2$), the second output pressure 806 is sufficiently high to cause the pneumatic actuator-regulating accessory 200 to deactivate and, thus, cause the exhaust port 206 to close. In some examples, because control fluid is being supplied into the first connection 310 as initiated in block 710, the first output pressure 808 begins increasing. In the period of time between the time point 814 ($T_2$) and the time point 816 ($T_3$), the second output pressure 806 and first output pressure 808 begin to equalize.

At the time point 816 ($T_3$), when the second output pressure 806 and the first output pressure 808 have equalized, the valve assembly 600 returns to normal operating conditions and control fluid begins acting on the actuator 308. The control fluid flowing into the actuator 308 causes the valve travel 804 to begin increasing. When, at the time point 818, the valve travel 804 has reached 100% and the output pressures 806, 808 have reached the pressure associated with the valve in the fully-open state (e.g., $P_H$), the output pressures 806, 808 as well as the valve travel 804 stop increasing. After a period of time, the method 700 ends at the time point 820 ($T_{END}$).

At block 714, the field instrument 104 identifies an operation of the pneumatic actuator-regulating accessory 200. For example, the field instrument 104 identifies the pressure at the second connection 604 at the time point 814 ($T_2$) as the deactivation threshold of the pneumatic actuator-regulating accessory 200 (e.g., the untrip point of a trip point). Additionally or alternatively, when the pressure at the first connection 310 begins equalizing to that at the second connection 604 (e.g., at the time point 814), the field instrument 104 may identify that point as the deactivation threshold of the pneumatic actuator-regulating accessory 200. At block 716, the technician removes the tubing 602 between field instrument 104 and pneumatic actuator-regulating accessory 200. For example, the field instrument 104 provides instructions to the technician to remove the tubing 602 between field instrument 104 and pneumatic actuator-regulating accessory 200. In some examples, the technician recouples the supply port 204 (of FIG. 2) of the pneumatic actuator-regulating accessory 200 to the supply 304. The example method 700 then ends.

Figure 9:
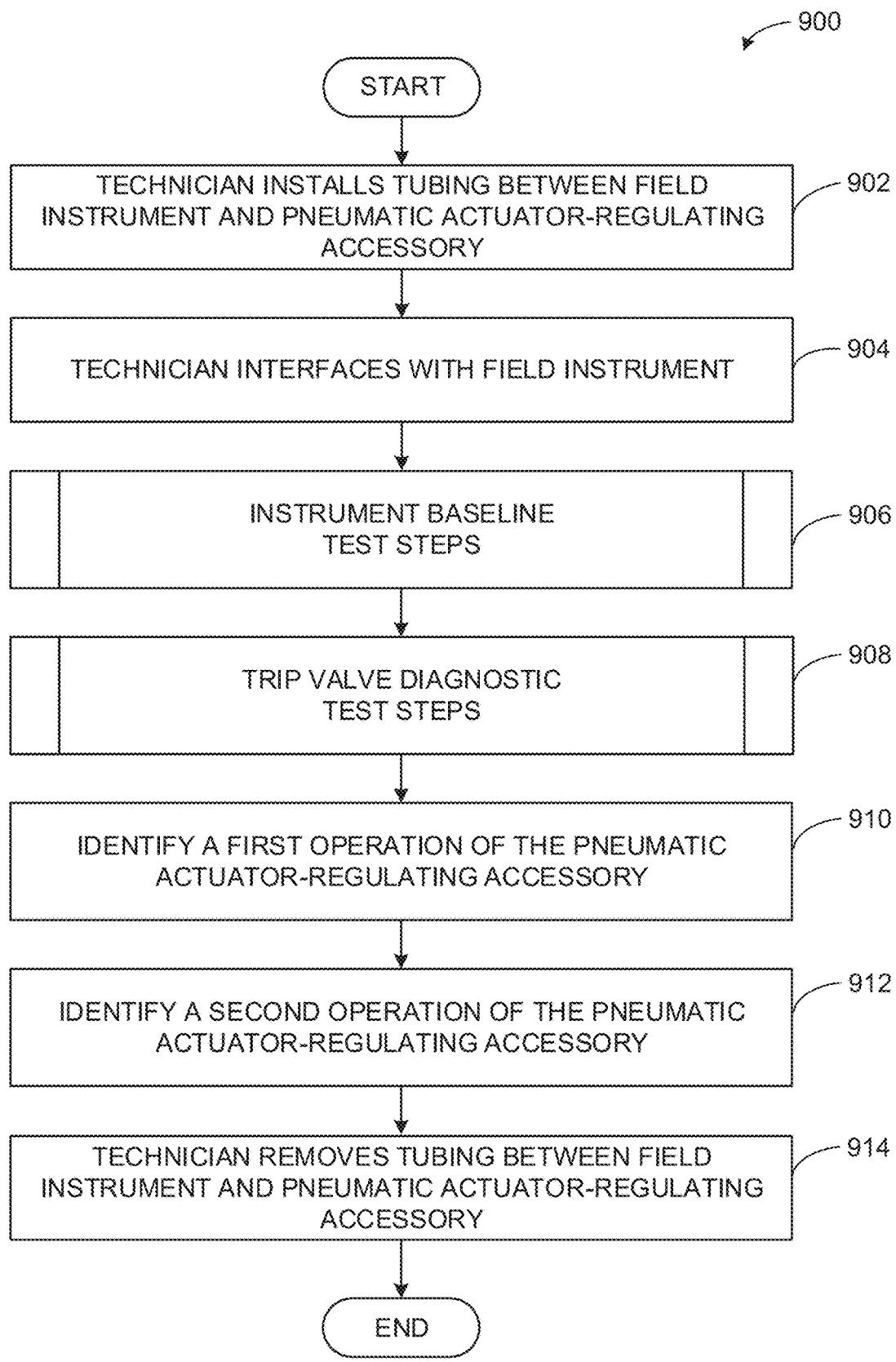
FIG. 9 is a flowchart representative of an example method for conducting the supply pressure combined diagnostic test for a pneumatic actuator-regulating accessory on the valve assembly of FIG. 6.

An example method 900 of implementing a supply pressure combined diagnostic test on a valve assembly (e.g., the valve assembly 600 of FIG. 6) is described in connection with FIG. 9, which begins at block 902. At block 902, a technician installs the tubing 602 between the field instrument 104 and the pneumatic actuator-regulating accessory 200. For example, the technician couples an additional connection (e.g., the second connection 604 of FIG. 6) between the field instrument 104 and the supply port 204 of the pneumatic actuator-regulating accessory 200. At block 904, the technician interfaces with the field instrument 104. For example, the technician may interface with the field instrument 104 with a laptop or tablet via a USB dongle connection. Additionally or alternatively, the technician may remotely interface with the field instrument 104 from a control room. In some examples, the technician initiates supply pressure combined diagnostic test.

At block 906, the field instrument 104 performs the instrument baseline test steps. This process is described in detail below in conjunction with FIGS. 10 and 11. At block 908, the field instrument 104 performs the instrument diagnostic test steps. This process is described in detail below in conjunction with FIGS. 12 and 13.

At block 910, the field instrument 104 identifies an operation of the pneumatic actuator-regulating accessory 200. For example, the field instrument 104 identifies the pressure at the second connection 604 at the time point 1314 (FIG. 13) as the deactivation threshold of the pneumatic actuator-regulating accessory 200. Additionally or alternatively, when the pressure at the first connection 310 begins equalizing to that at the second connection 604, the field instrument 104 may identify that point as the deactivation point of the pneumatic actuator-regulating accessory 200.

At block 912, the field instrument 104 identifies a second operation of the pneumatic actuator-regulating accessory 200. In some examples, the field instrument 104 compares a travel rate of the valve 102 determined during the execution of block 906 to a travel rate of the valve 102 determined during the execution of block 908. In other examples, the field instrument 104 may identify the time point 1322 (FIG. 13) as the activation point of the pneumatic actuator-regulating accessory 200 by any suitable means.

At block 914, the technician removes the tubing 602 between field instrument 104 and the pneumatic actuator-regulating accessory 200. For example, the field instrument 104 provides instructions to the technician to remove the tubing 602 between the field instrument 104 and the pneumatic actuator-regulating accessory 200. In some examples, the technician recouples the supply port 204 (of FIG. 2) of the pneumatic actuator-regulating accessory 200 to the supply 304. The example method 900 then ends.

Figure 10:
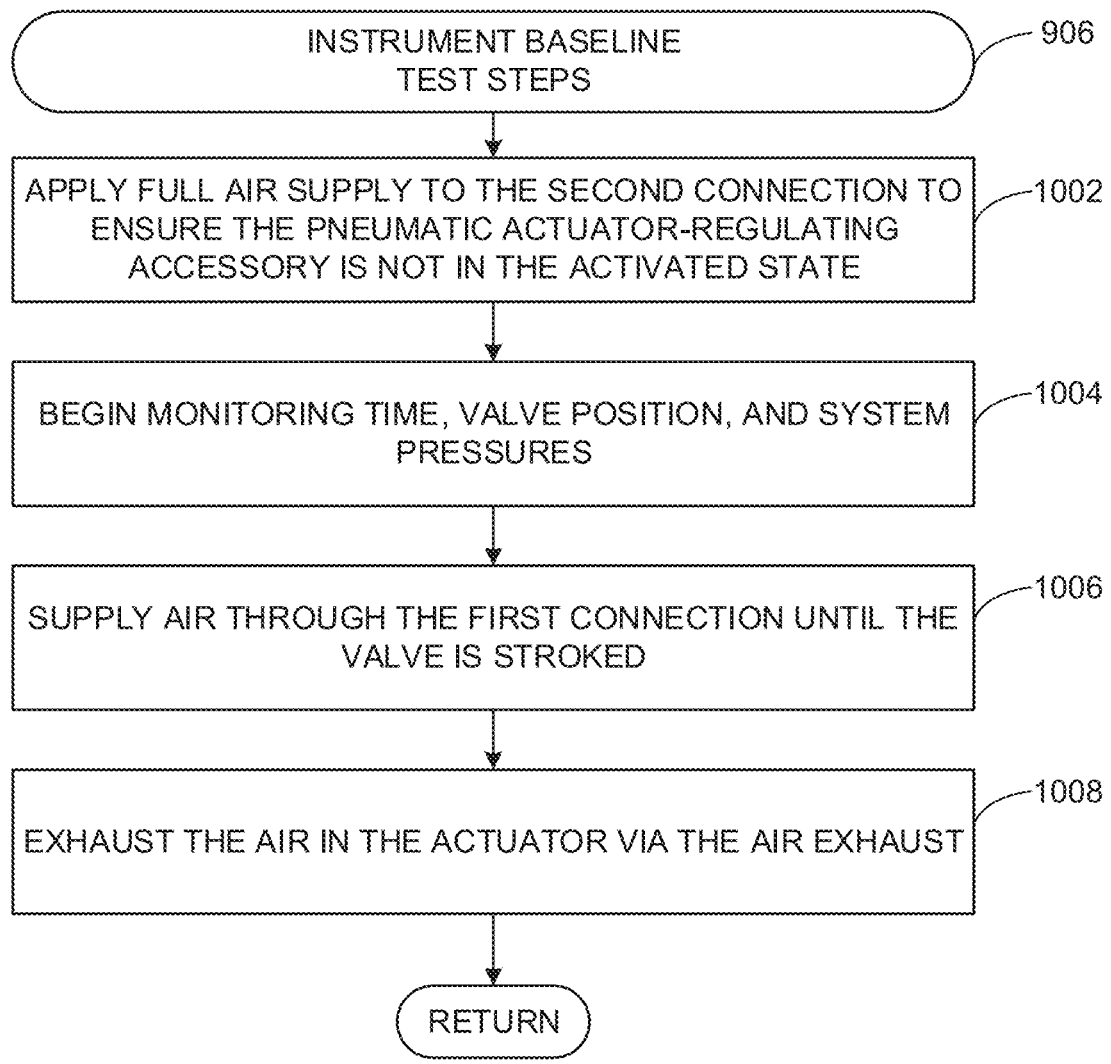
FIG. 10 is a flowchart representative of an example method for conducting the baseline portion of the combined diagnostic test for a pneumatic actuator-regulating accessory on the valve assembly of FIG. 6.

Additional detail in connection with performing the instrument baseline test steps (block 906 of FIG. 9) is shown in FIG. 10. FIG. 10 is a flowchart representative of an example method 1000 that may be performed by the field instrument 104 and technician to conduct the instrument baseline test steps of the supply pressure combined diagnostic test (process 906 of FIG. 10). The example method 1000 begins at block 1002. At block 1002, the field instrument 104 redirects control fluid to the second connection 604 to ensure the pneumatic actuator-regulating accessory 200 is not in the activated state. For example, the field instrument 104 may route control fluid from the supply 304 to the pneumatic actuator-regulating accessory 200 via the first connection 310.

At block 1004, the field instrument 104 begins monitoring time, valve position and system pressures. For example, the field instrument 104 may measure the position of the valve directly or indirectly by monitoring the position of the actuator 308 (of FIG. 6). Additionally, in some examples, the field instrument 104 measures the pressure of the control fluid delivered from the supply 304 and the pressure regulator 302 as well as the pressure at the first connection 310 and the second connection 604.

Figure 11:
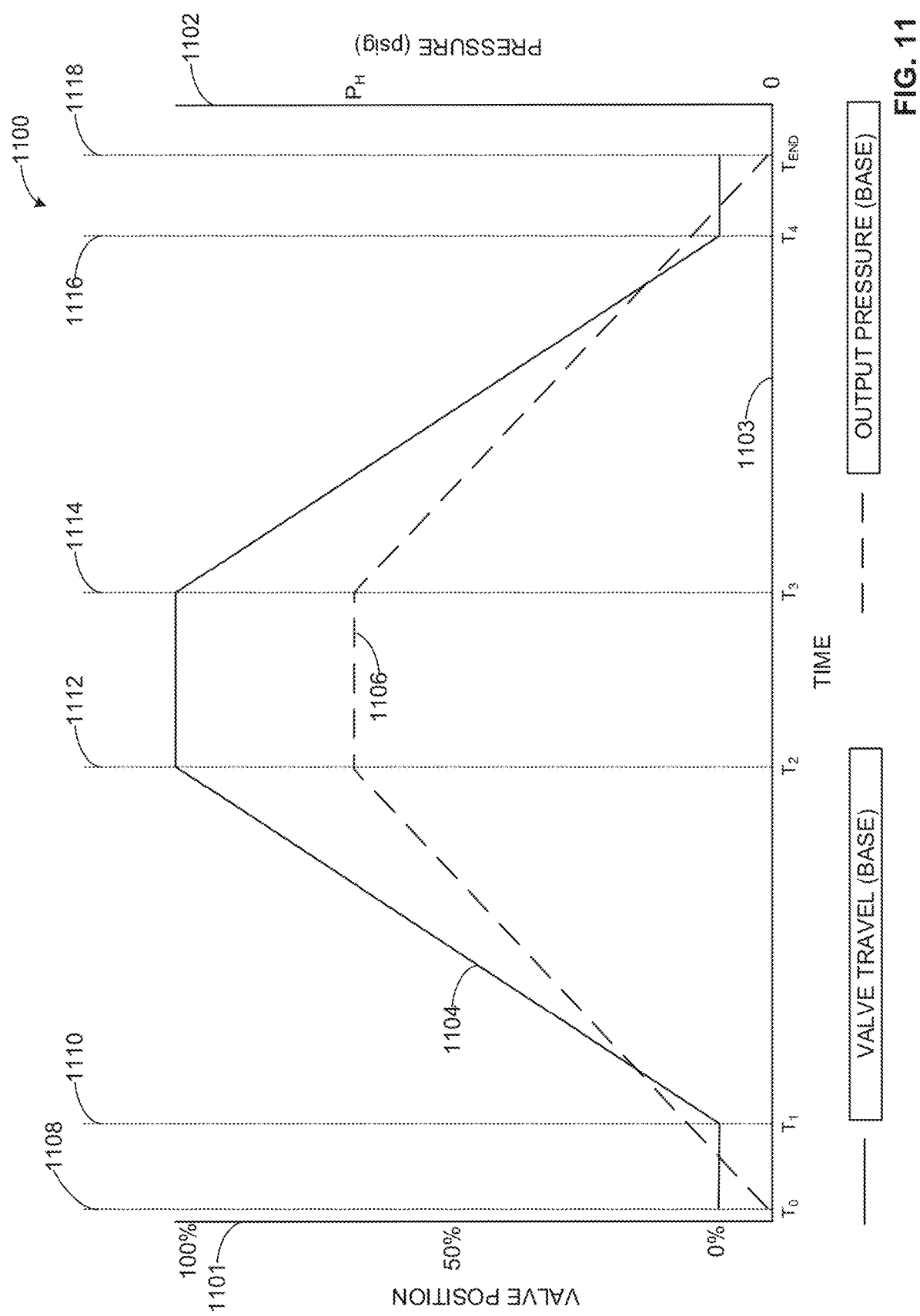
FIG. 11 is an example valve position and pressure graph for the baseline portion of the combined diagnostic test of FIG. 10.

FIG. 11 is an example valve position and pressure graph 1100 of the method 1000 (e.g., the instrument baseline test steps) of FIG. 10. The example graph 1100 has a first y-axis 1101, a second y-axis 1102, and an x-axis 1103. Additionally, the graph 1100 tracks baseline valve travel 1104 (represented by a solid line) and baseline output pressure 1106 (represented by a dashed line). In some examples, the baseline output pressure 1106 corresponds to the pressure at the first connection 310. The x-axis 1103 measures the independent variable time and begins at $T_0$ and ends at $T_{END}$. In some examples, the elapsed time between $T_0$ and $T_{END}$ depends on how quickly the field instrument 104 is able to change the pressure throughout the example valve assembly 600. Additionally or alternatively, the elapsed time between $T_0$ and $T_{END}$ is selected by at the technician. Time points 1108, 1110, 1112, 1114, 1116 and 1118 are associated with $T_0$, $T_1$, $T_2$, $T_3$, $T_4$ and $T_{END}$ respectively.

The first y-axis 1101 measures valve position. In the example valve assembly 600, a value of 100% on the first y-axis 1101 indicates that valve 102 is in the fully-open state and 0% indicates the valve 102 is in the closed state. Alternatively in some examples, such as in the case that actuator 308 is a single-acting fluid-to-close actuator, a value of 100% on the first y-axis 1101 indicates that the valve 102 is in the closed state and 0% indicates that the valve 102 is in the open state. In some examples, a value of 50% on the first y-axis 1101 indicates the example valve 102 is half-way between the fully-open state and the closed state. Alternatively, in some examples, the first y-axis 1101 may have physical units of measurement (e.g., inches, cm, etc.).

The second y-axis 1102 measures pressure ranges from zero to $P_H$, and uses any suitable unit of pressure (e.g., psi, Pa, atm, etc.). In some examples, the upper range at the second y-axis 1102, $P_H$, is selected as the pressure which results in the valve 102 being in a fully-open state. In some examples, the upper range of the second y-axis 1102, $P_H$, is selected such that it is above the estimated activation threshold of the pneumatic actuator-regulating accessory 200. In other examples, $P_H$ is the maximum allowable valve assembly 300 pressure.

The example line representing valve travel 1104 tracks the position of the flow control member of the valve 102 (e.g., with reference to the first y-axis 1101) as a function of time (e.g., with reference to the x-axis 1103). The example line representing the baseline output pressure 1106 tracks the pressure (e.g., with reference to the second y-axis 1102) at the first connection 310 as a function of time (e.g., with reference to the x-axis 1103).

Returning to FIG. 10, at block 1006, the field instrument 104 redirects control fluid into the first connection 310 until the valve 102 is stroked. For example, the field instrument 104 may redirect control fluid from the supply 304 to the first connection 310. In some examples, the field instrument 104 records the valve travel 1104 and the baseline output pressure 1106 as the valve 102 is stroked as initiated in block 1004. The time between the time point 1108 ($T_0$) and the time point 1112 ($T_2$) of the graph 1100 is associated with the state of the valve assembly 600 during the execution of block 1006. The baseline output pressure 1106 increases as control fluid is redirected into the first connection 310. In the illustrated example, there is a delay (e.g., the time between the time point 1108 ($T_0$) and the time point 1110 ($T_1$)) before the flow control member of the valve 102 begins moving. In other examples, there is no delay and the valve travel 1104 begins increasing at the same time as the baseline output pressure 1106. At the time point 1112 ($T_2$), the valve travel 1104 and the baseline output pressure 1106 correspond to the values 100% and $P_H$, respectively (e.g., the value 102 has been fully stroked).

At block 1008, the field instrument 104 exhausts control fluid in the actuator 308 via the exhaust 306. For example, the field instrument 104 may open a fluid path between the actuator 308 and the exhaust 306 to enable control fluid to be exhausted from the actuator 308 through the pneumatic actuator-regulating accessory 200, through the field instrument 104 and then out through the exhaust 306. The time between the time point 1114 ($T_3$) and the time point 1118 ($T_{END}$) of graph 1100 is associated with the state of the valve assembly 600 during the execution of block 1008. The baseline output pressure 1106 decreases as control fluid is exhausted via the exhaust 306. In the illustrated example, the valve travel 1104 decreases to 0% at the time point 1116 ($T_4$) before the baseline output pressure 1106 reaches atmospheric pressure (e.g., 0 psig) at the time point 1118 ($T_{END}$). In other examples, there is no delay between the valve travel 1104 decreasing to 0% and the baseline output pressure 1106 decreasing to atmospheric pressure (e.g., 0). The process 906 then ends and the field instrument 104 stops monitoring the baseline instrument steps (e.g., process 906) at $T_{END}$.

Figure 12:
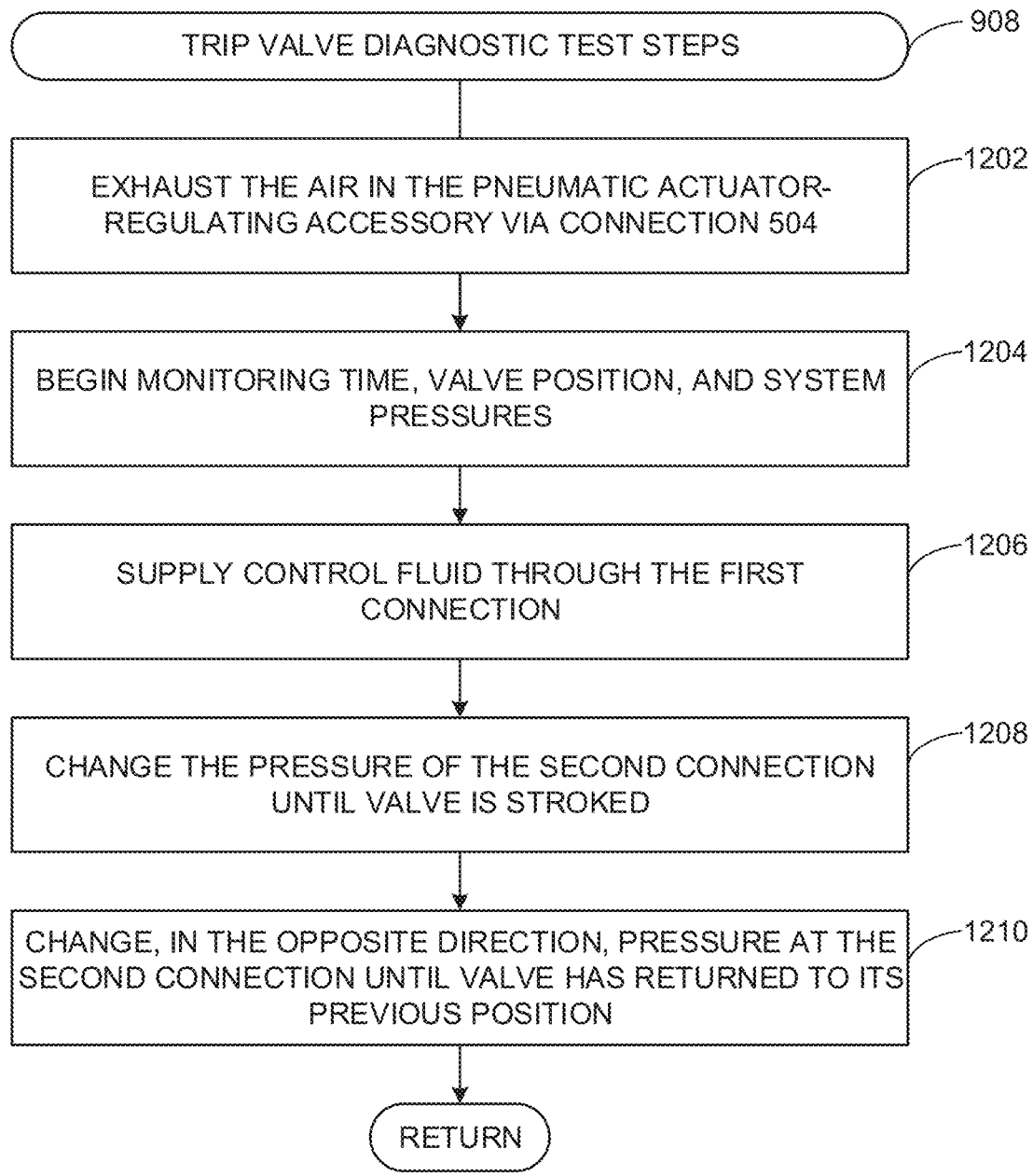
FIG. 12 is a flowchart representative of an example method for conducting the diagnostic portion of the combined diagnostic test for a pneumatic actuator-regulating accessory on the valve assembly of FIG. 6.

Additional detail in connection with performing the instrument diagnostic test steps (block 908 of FIG. 9) is shown in FIG. 12. At block 1202, the field instrument 104 exhausts the control fluid in the pneumatic actuator-regulating accessory 200 via the second connection 604. In some examples, this ensures the pneumatic actuator-regulating accessory 200 is in the activated state (e.g., ensuring the trip valve is tripped). In some examples, when the pneumatic actuator-regulating accessory 200 activates, control fluid in the actuator 308 is exhausted via the exhaust port 206 of the pneumatic actuator-regulating accessory 200.

At block 1204, the field instrument 104 begins monitoring time, valve position and system pressures. For example, the field instrument 104 may measure the position of the valve 102 directly or indirectly by monitoring the position of the actuator 308 (of FIG. 6). Additionally, in some examples, the field instrument 104 measures the pressure of the control fluid at the first connection 310 and the second connection 604.

Figure 13:
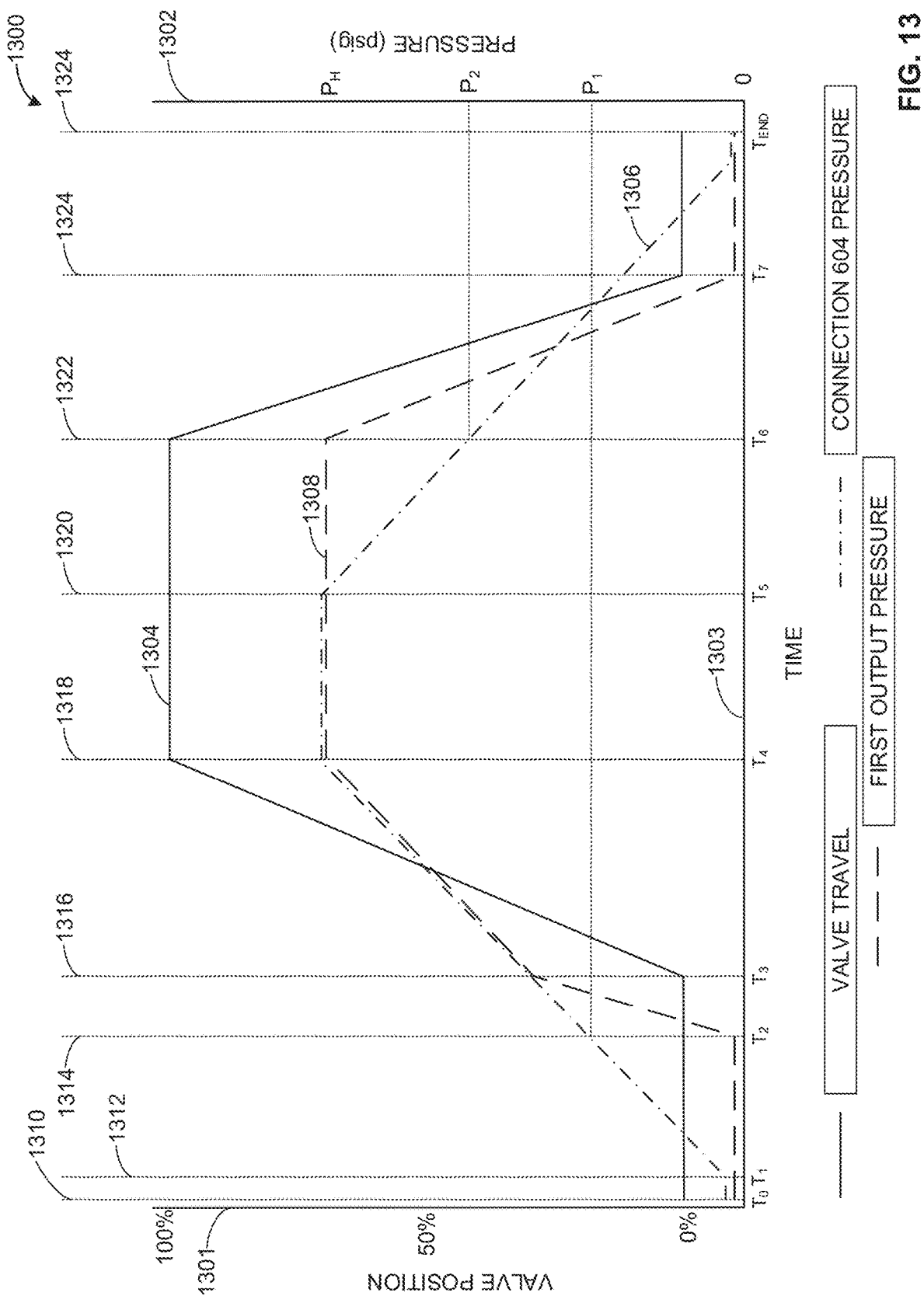
FIG. 13 is an example valve position and pressure graph for the diagnostic portion of the combined diagnostic test of FIG. 12.

FIG. 13 is an example valve position and pressure graph 1300 of the supply pressure of the method 908 (e.g., the diagnostic test steps) of FIG. 12. The example graph 1300 has a first y-axis 1301, a second y-axis 1302, and an x-axis 1303. Additionally, the graph 1300 tracks valve travel 1304 (represented by a solid line) which represents the travel of the flow control member of valve 102, a second output pressure 1306 at the second connection 604 (represented by a dashed-dotted line) and a first output pressure 1308 at the first connection 310 (represented by a dashed line). The x-axis 1303 measures the independent variable time, begins at $T_0$ and ends at $T_{END}$. In some examples, the elapsed time between $T_0$ and $T_{END}$ depends on how quickly the field instrument 104 is able to change the pressure throughout the example valve assembly 600. Additionally or alternatively, the elapsed time between $T_0$ and $T_{END}$ is selected by the technician. Time points 1310, 1312, 1314, 1316, 1318, 1320, 1322, 1324 and 1326 are associated with $T_0$, $T_1$, $T_2$, $T_3$, $T_4$, $T_5$, $T_6$ and $T_{END}$ respectively.

The first y-axis 1301 measures valve position. In the example valve assembly 600, a value of 100% on the first y-axis 1301 indicates that valve 102 is in the fully-open state and 0% indicates the valve 102 is in the closed state. Alternatively in some examples, such as in the case that actuator 308 is a single-acting fluid-to-close actuator, a value of 100% on the first y-axis 1301 indicates that the valve 102 is in the closed state and 0% indicates that the valve 102 is in the fully-open state. In some examples, a value of 50% on the first y-axis 1301 indicates the example valve 102 is half-way between the fully-open state and the closed state. Alternatively, in some examples, the first y-axis 1301 may have physical units of measurement (e.g., inches, cm, etc.).

The second y-axis 1302 measures pressure ranges from zero to $P_H$, and uses any suitable unit of pressure (e.g., psi, Pa, atm, etc.). In some examples, the upper range of the second y-axis 1302, $P_H$, is selected as the pressure which results in the valve 102 being in a fully-open state. In some examples, the upper range of the second y-axis 1302, $P_H$, is selected such that it is above the estimated activation threshold of the pneumatic actuator-regulating accessory 200. In other examples, $P_H$ is the maximum allowable valve assembly 600 pressure.

The example line representing valve travel 1304 tracks the position of the flow control member of the valve 102 (e.g., with reference to the first y-axis 1301) as a function of time (e.g., with reference to the x-axis 1303). The example line representing the first output pressure 1308 tracks the pressure (e.g., with reference to the second y-axis 1302) at the first connection 310 as a function of time (e.g., with reference to the x-axis 1303). The example line representing the second output pressure 1306 tracks the pressure (e.g., with reference to the second y-axis 1302) at the second connection 604 as a function of time (e.g., with reference to the x-axis 1303).

At block 1206, the field instrument 104 supplies control fluid through the first connection 310. For example, the field instrument 104 redirects control fluid supplied by the supply 304 into the first connection 310. In some examples, because the pneumatic actuator-regulating accessory 200 is in the activated state, the control fluid supplied through the first connection 310 is exhausted through the exhaust port 206 of pneumatic actuator-regulating accessory 200 and does not flow to the actuator 308. The time point 1310 ($T_0$) is associated with the execution of block 1206. In some examples, because the exhaust port 206 is open, redirecting control fluid into the first connection 310 does not cause the valve travel 1304, the second output pressure 1306 or, the first output pressure 1308 to increase.

At block 1208, the field instrument 104 begins changing the pressure at the second connection 604 until the valve 102 is stroked. In some examples, the field instrument 104 changes the pressure at the second connection 604 with small periodic steps (e.g., a staircase function or a sequential ramp function) to ensure the pressure when the pneumatic actuator-regulating accessory 200 activates can be identified within an acceptable precision and accuracy. In some examples, when the pressure at the second connection 604, which acts as the supply pressure to the pneumatic actuator-regulating accessory 200, increases past the deactivation threshold, the pneumatic actuator-regulating accessory 200 deactivates. In some examples, when the pneumatic actuator-regulating accessory 200 deactivates, the exhaust port 206 closes, allowing control fluid to flow into the actuator 308.

The time point 1312 ($T_1$) of graph 1300 is associated with the state of the valve assembly 600 immediately after the execution of block 1208. At the time point 1312, the field instrument 104 begins increasing the second output pressure 1306. The second output pressure 1306 increases until it reaches the deactivation threshold ($P_D$) of the pneumatic actuator-regulating accessory 200 at time point 1314 ($T_2$). At the time point 1314 ($T_2$), the second output pressure 1306 is sufficiently high to cause the pneumatic actuator-regulating accessory 200 to deactivate and for the exhaust port 206 to close. In some examples, because control fluid is being supplied into the first connection 310 as initiated at block 1206, the first output pressure 1308 begins increasing. In the period of time between the time point 1314 ($T_2$) and the time point 1316 ($T_3$), the second output pressure 1306 and the first output pressure 1308 equalize.

At the time point 1316 ($T_3$), once the second output pressure 1306 and the first output pressure 1308 have equalized, the valve assembly 600 returns to normal operating conditions and control fluid begins acting on the actuator 308. The control fluid flowing into the actuator 308 causes the valve travel 1304 to begin increasing. Once the valve travel 1304 has reached 100% and the first and second output pressures 1308, 1306 have reached the pressure associated with the valve being in the fully-open state (e.g., $P_H$), the second output pressure 1306, the first output pressure 1308 and the valve travel 1304 stop increasing.

At block 1210, the field instrument 104 changes, in the opposite direction (with reference to block 1208), the pressure at the second connection 604 until the valve 102 has returned to the previous position (prior to starting the method 1200). In some examples, when the second output pressure 1306, which acts as the supply pressure to the pneumatic actuator-regulating accessory 200, crosses the activation threshold of the pneumatic actuator-regulating accessory 200, the pneumatic actuator-regulating accessory 200 is activated and the control fluid is exhausted via the exhaust port 206.

The time between the time point 1320 ($T_5$) and the time point 1326 ($T_{END}$) is associated with the execution of block 1210. At block 1320 ($T_5$), as the field instrument 104 begins exhausting the control fluid at the second connection 604, the second output pressure 1306 begins decreasing. At the time point 1322 ($T_6$), the second output pressure 1306 crosses the activation threshold of the pneumatic actuator-regulating accessory 200 which causes the pneumatic actuator-regulating accessory 200 to activate and the exhaust port 206 to open. At the time point 1322 ($T_6$), the control fluid in the actuator 308 and the first connection 310 is exhausted, which causes the valve travel 1304 and the first output pressure 1308 to rapidly decrease from 100% and $P_H$, respectively. At the time point 1324 ($T_7$), the valve travel 1304 decreases to 0% (e.g., the valve 102 has been fully stroked) and the second output pressure 1306 decreases to 0 (e.g., atmospheric pressure). Once the second output pressure 1306 decreases to 0 (e.g., atmospheric pressure), the method 1200 ends at the time point 1326 ($T_{END}$).

Figure 14:
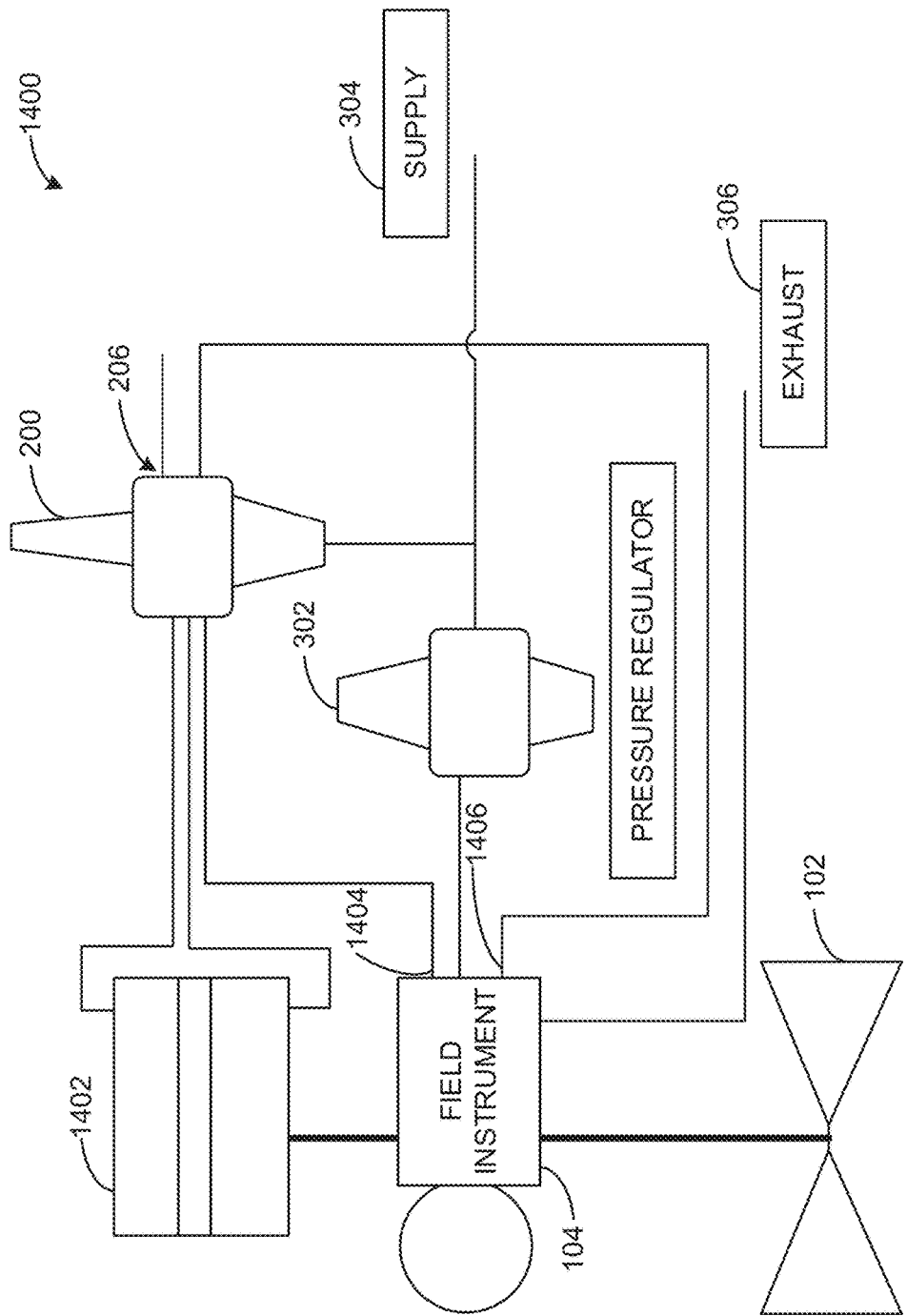
FIG. 14 is a schematic diagram of a valve assembly with a double-acting actuator in which an example of the supply pressure diagnostic test for a trip valve may be implemented.

FIG. 14 is an example valve assembly 1400 in which a trip valve trip diagnostic test may be implemented for a double-acting actuator 1402. This valve assembly 1400 includes the field instrument 104, the pneumatic actuator-regulating accessory 200, the pressure regulator 302, the supply 304, the exhaust 306 and the double-acting actuator 1402. The field instrument 104 is operably coupled to the pneumatic actuator-regulating accessory 200 via a first connection 1404 and a second connection 1406. Additionally, in the illustrated example, the field instrument 104 is coupled to the pressure regulator 302 and the exhaust 306. In some examples, the supply 304 is coupled to the pressure regulator 302 and the pneumatic actuator-regulating accessory 200. In the illustrated example, when the pneumatic actuator-regulating accessory 200 activates, the double-acting actuator 1402 moves to the closed state (e.g., the actuator 1402 is a closed biased double-acting actuator). Alternatively, depending on the configuration of the double-acting actuator 1402, when the pneumatic actuator-regulating accessory 200 activates, the double actuator 1402 may move to the fully-open state (e.g., the actuator 1402 is an open biased double-acting actuator), the most recent position of the valve 102 or another position desired by the valve operator. In the illustrated example, flow directed through the first connection 1404 urges the actuator 1402 towards the closed state and flow directed through the second connection 1406 urges the actuator 1402 towards the fully-open state.

Figure 15:
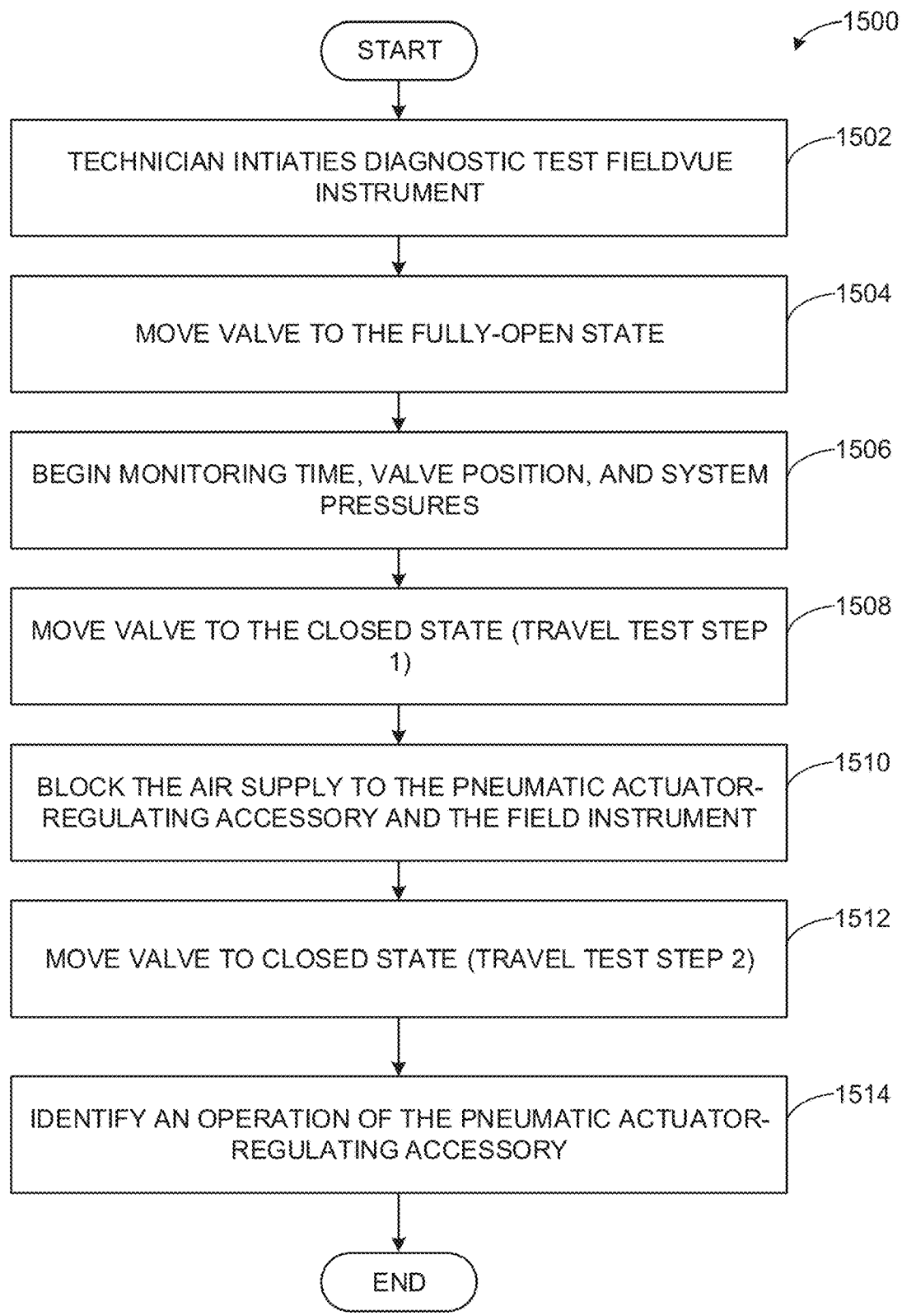
FIG. 15 is a flowchart representative of an example method for conducting the loss of supply pressure diagnostic test for a pneumatic actuator-regulating accessory on the valve assembly of FIG. 14.

An example method 1500 of implementing a loss of supply pressure diagnostic test on a valve assembly with a double-acting actuator (e.g., the valve assembly 1400 of FIG. 14) is described in connection with FIG. 15, which begins at begins at block 1502. At block 1502, a technician interfaces with the field instrument 104. For example, the technician may interface with the field instrument 104 with a laptop or tablet via a USB dongle connection. Additionally or alternatively, the technician may remotely interface with the field instrument 104 from a control room. In some examples, the technician initiates the loss of supply pressure diagnostic test.

At block 1504, the field instrument moves the valve 102 into the fully-open state. For example, if the double-acting actuator 1402 is unbiased and direct, the field instrument 104 may redirect control fluid from the supply 304 into the second connection 1406 to move the actuator 1402 (e.g., moving the valve 102 towards the fully-open state.) In other examples, if the double-acting actuator 1402 has a closed bias, the field instrument 104 may direct control fluid through the second connection 1406 and no control fluid through the first connection 1404. In other examples, depending on the type of the double actuator 1402 and configuration of the valve assembly 600, the field instrument 104 may adjust the flow into the first connection 1404 and the second connection 1406 appropriately to move the valve 102 to the open state.

At block 1506, the field instrument 104 begins monitoring time, valve position and system pressures. For example, the field instrument 104 may measure the position of the valve 102 directly or indirectly by monitoring the position of the actuator 1402. Additionally, in some examples, the field instrument 104 measures the pressure of the connection delivered from the supply 304 and the pressure regulator 302 as well as the pressure at the first connection 1404 and the second connection 1406.

At block 1508, the field instrument 104 moves the valve 102 to the closed state (travel test step 1). For example, if the double-acting actuator 1402 is unbiased and direct, the field instrument 104 exhausts control fluid from the first connection 1404, causing the double-acting actuator 1402 move to force the valve 102 into the closed state. In other examples, the field instrument 104 exhausts control fluid from the first connection 1404 and/or the second connection 1406 as appropriate to move the valve 102 to the closed state.

At block 1510, the technician blocks the supply 304 to the pneumatic actuator-regulating accessory 200 and the field instrument 104. For example, the technician may receive instructions from the field instrument 104 to block the supply 304. In this example, the technician manually blocks the supply 304. In other examples, the field instrument 104 may execute instructions that cause the supply 304 to be blocked. In this example, the field instrument 104 may automatically block the supply 304 by interfacing with and closing a valve that controls the flow of the control fluid to the pneumatic actuator-regulating accessory 200 and the field instrument 104.

At block 1512, the field instrument 104 moves the valve 102 to the closed state (travel test step 2). For example, if the double-acting actuator 1402 is unbiased and direct, the field instrument 104 exhausts control fluid from the first connection 1404, causing the double-acting actuator 1402 to move and force the valve 102 into the closed state. In other examples, the field instrument 104 exhausts control fluid from the first connection 1404 and/or the second connection 1406 as appropriate to move the valve 102 to the closed state. In some examples, since the supply 304 to the pneumatic actuator-regulating accessory 200 is blocked, exhausting control fluid via the exhaust 306 causes the supply pressure to the pneumatic actuator-regulating accessory 200 to decrease beneath the activation threshold of the pneumatic actuator-regulating accessory 200, causing the pneumatic actuator-regulating accessory 200 to activate. In this example, if the pneumatic actuator-regulating accessory 200 is a trip valve, control fluid is also exhausted from the exhaust port 206 (of FIG. 2). In some examples, the control fluid exhausted via the exhaust port 206 results in a different travel rate of the valve 102.

At block 1514, the field instrument 104 identifies an operation of the pneumatic actuator-regulating accessory 200. In some examples, the field instrument 104 compares the travel rate of the valve 102 determined during the execution of block 1508 (travel step 1) to the travel rate of the valve 102 determined during the execution of block 1512 (travel step 2). In this example, if the travel rate determined during the execution of block 1512 exceeds the travel rate determined during the execution of block 1508, it can be determined the pneumatic actuator-regulating accessory 200 activated. Additionally or alternatively, the operation of the pneumatic actuator-regulating accessory 200 may be determined by monitoring when the pressure at the first connection 1404 and/or the second connection 1406 begins decreasing or when the flow control member of the valve 102 begins moving. In this example, a sudden decrease in pressure indicates that the pneumatic actuator-regulating accessory 200 has activated.

Figure 16:
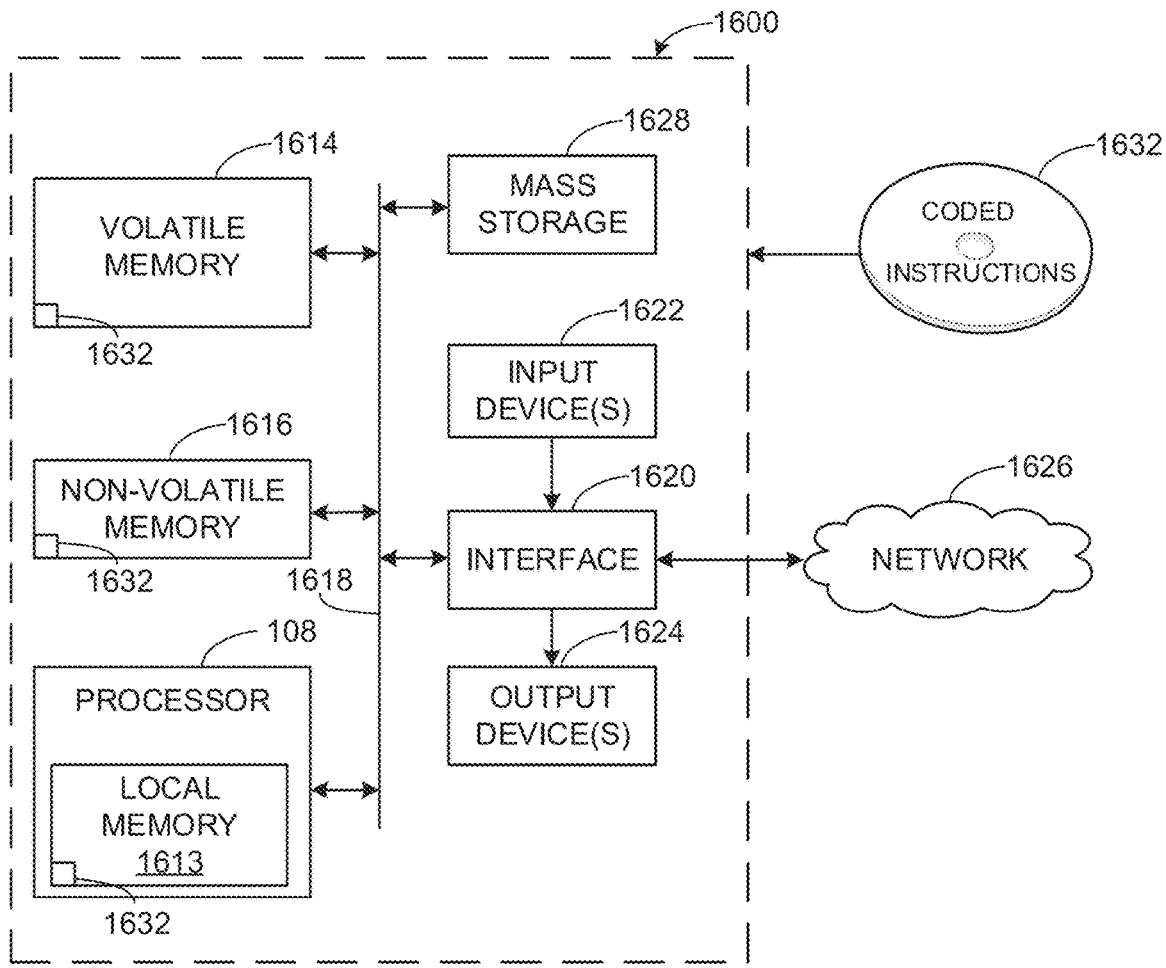
FIG. 16 is a diagram of a processor platform which may be used to implement examples disclosed herein.

FIG. 16 is a block diagram of an example processor platform 1600 capable of executing the methods of 4, 7, 9, 10, 12 and 15 to implement the field instrument 104 of FIG. 1. The processor platform 1600 can be, for example, a structure within the field instrument 104 (e.g., the platform for the processor 108 of FIG. 1), a server, a personal computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 108. The processor 108 of the illustrated example is hardware. For example, the processor 108 can be implemented by one or more integrated circuits, logic circuits, microprocessors or controllers from any desired family or manufacturer. The hardware processor may be a semiconductor based (e.g., silicon based) device. In this example, the processor 108 is incorporated into the field instrument 104 (e.g., the processor 108 of FIG. 1).

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a peripheral component interconnect (PCI) express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip, and/or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and DVD drives.

Coded instructions 1632 to implement the methods of FIGS. 4, 7, 9-10, 12 and 15 may be stored in the mass storage device 1628, in the volatile memory 1614, in the non-volatile memory 1616, and/or on a removable non-transitory computer readable storage medium such as a CD or DVD.

From the foregoing, it will be appreciated that example methods, apparatus and articles of manufacture have been disclosed that significantly increase the accuracy and efficiency of identifying the activation and deactivations points of a pneumatic actuator-regulating accessory (e.g., the trip point or the untrip point of a trip valve) by disclosing a standardized diagnostic method for determining those points.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
stroking a fluid valve operatively coupled to a field instrument and a pneumatic actuator-regulating accessory by pressurizing an actuator operatively coupled to the fluid valve;
blocking a supply to the pneumatic actuator-regulating accessory and the field instrument;
exhausting pressurized air from the actuator via the field instrument by commanding the field instrument to cause successive reductions in the pressure in the actuator at a predetermined rate to cause a travel rate of the fluid valve to be less than a maximum travel rate of the fluid valve, the maximum travel rate of the fluid valve occurring when the exhaust of the field instrument is fully open;
measuring at least one of (1) positions of the fluid valve or (2) an output pressure of the field instrument as the pressurized air is exhausted from the actuator; and
identifying a first operation of the pneumatic actuator-regulating accessory based on at least one of the travel rate of the fluid valve or the output pressure of the field instrument, the travel rate of the fluid valve based on the measured positions of the fluid valve.

2. The method of claim 1, wherein the pneumatic actuator-regulating accessory is a trip valve.

3. The method of claim 2, wherein the first operation is a trip point of the trip valve.

4. The method of claim 3, wherein identifying the trip point of the trip valve includes at least one of (1) comparing the travel rate of the fluid valve to the maximum travel rate of the fluid valve when exhausting the pressurized air via the field instrument or (2) identifying a change in the output pressure of the field instrument.

5. The method of claim 4, further comprising determining the maximum travel rate of the fluid valve by:
stroking the fluid valve by pressurizing the actuator;
exhausting the pressurized air from the actuator via the field instrument by commanding the field instrument to exhaust at a maximum rate; and
measuring the travel rate of the fluid valve while the pressurized air is exhausted at the maximum rate.

6. The method of claim 1 further including communicating with the field instrument to initiate the exhausting of the pressurized air, the measuring at least one of (1) positions of the fluid valve or (2) an output pressure of the field instrument as the pressurized air is exhausted from the actuator, and the identifying the first operation of the pneumatic actuator-regulating accessory based on at least one of the travel rate of the fluid valve or the output pressure of the field instrument.

7. The method of claim 6, wherein communicating with the field instrument includes communicating via a local interface of the field instrument.

8. The method of claim 1, wherein blocking the supply includes a person changing a configuration of a supply line fluidly coupled to the pneumatic actuator-regulating accessory and the field instrument.

9. A method comprising:
stroking a fluid valve operatively coupled to a field instrument and a trip valve by pressurizing an actuator operatively coupled to the fluid valve;
blocking a supply to the trip valve and the field instrument;
exhausting pressurized air from the actuator via the field instrument;
measuring at least one of (1) positions of the fluid valve or (2) an output pressure of the field instrument as the pressurized air is exhausted from the actuator; and
identifying a trip point of the trip valve based on at least one of a travel rate of the fluid valve or the output pressure of the field instrument, the travel rate of the fluid valve based on the measured positions of the fluid valve, the identification of the trip point including at least one of (1) comparing the travel rate of the fluid valve to a maximum travel rate of the fluid valve when exhausting the pressurized air via the field instrument or (2) identifying a change in the output pressure of the field instrument, the trip point corresponding to the output pressure of the field instrument that causes an activation of the trip valve, the activation of the trip valve causing the actuator to move to a predetermined position.

10. The method of claim 9, further comprising determining the maximum travel rate of the fluid valve by:
stroking the fluid valve by pressurizing the actuator;
exhausting the pressurized air from the actuator via the field instrument by commanding the field instrument to exhaust at a maximum rate; and
measuring the travel rate of the fluid valve while the pressurized air is exhausted at the maximum rate.

11. The method of claim 9, wherein exhausting the pressurized air from the actuator via the field instrument includes commanding the field instrument to cause successive reductions in a pressure of the pressurized air in the actuator at a predetermined rate to cause the travel rate of the fluid valve to be less than the maximum travel rate of the fluid valve.

12. The method of claim 9, further including communicating with the field instrument to initiate the exhausting of the pressurized air, the measuring at least one of (1) positions of the fluid valve or (2) an output pressure of the field instrument as the pressurized air is exhausted from the actuator, and the identifying the trip point of the trip valve based on at least one of the travel rate of the fluid valve or the output pressure of the field instrument.

13. The method of claim 12, wherein communicating with the field instrument includes communicating via a local interface of the field instrument.

14. The method of claim 9, wherein blocking the supply includes a person changing a configuration of a supply line fluidly coupled to the trip valve and the field instrument.

* * * * *

UNITED STATES PATENT AND TRADEMARK OFFICE
CERTIFICATE OF CORRECTION

PATENT NO. : 11,060,415 B2
APPLICATION NO. : 15/877032
DATED : July 13, 2021
INVENTOR(S) : Brendan Keith Piscitelli It is certified that error appears in the above-identified patent and that said Letters Patent is hereby corrected as shown below:

In the Drawings

In Figure 4, in Field "404", delete "POSTION" and insert -- POSITION --.

In Figure 7, in Field "708", delete "POSTION" and insert -- POSITION --.

Signed and Sealed this
Fifteenth Day of November, 2022

Katherine Kelly Vidal
*Director of the United States Patent and Trademark Office*